United States Patent
Cirette et al.

(10) Patent No.: US 8,807,981 B2
(45) Date of Patent: *Aug. 19, 2014

(54) AUTOMATED SYSTEM FOR CHANGING A MOLD OF A MOLDING UNIT WITH WHICH A MACHINE FOR MANUFACTURING CONTAINERS IS PROVIDED

(75) Inventors: Damien Cirette, Octeville sur Mer (FR); Herve Pasquier, Octeville sur Mer (FR); Michel Norture, Octeville sur Mer (FR); Jocelyn Michel, Octeville sur Mer (FR)

(73) Assignee: Sidel Participations, Octeville sur Mer (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/000,703

(22) PCT Filed: Mar. 1, 2012

(86) PCT No.: PCT/EP2012/053486
§ 371 (c)(1),
(2), (4) Date: Aug. 21, 2013

(87) PCT Pub. No.: WO2012/119913
PCT Pub. Date: Sep. 13, 2012

(65) Prior Publication Data
US 2013/0337099 A1    Dec. 19, 2013

(30) Foreign Application Priority Data
Mar. 8, 2011    (FR) ..................... 11 51896

(51) Int. Cl.
| | |
|---|---|
| *B29C 49/38* | (2006.01) |
| *B29C 49/56* | (2006.01) |
| *B29C 33/20* | (2006.01) |
| *B29C 33/30* | (2006.01) |
| *B29C 49/42* | (2006.01) |
| *B29C 49/48* | (2006.01) |
| *B29C 49/36* | (2006.01) |

(52) U.S. Cl.
CPC .......... *B29C 49/38* (2013.01); *B29C 2049/4864* (2013.01); *B29C 2049/4858* (2013.01); *B29C 49/36* (2013.01); *B29C 49/56* (2013.01); *B29C 33/202* (2013.01); *B29C 33/305* (2013.01); *B29C 49/42* (2013.01); *B29C 2049/4866* (2013.01); *B29C 2049/4856* (2013.01); *B29C 33/30* (2013.01); *B29C 33/306* (2013.01)
USPC ......................................................... 425/195

(58) Field of Classification Search
CPC ............... B29C 2049/4858; B29C 2049/4864; B29C 2049/4866; B29C 33/306
USPC ......................... 425/182, 195, 522, 540, 541
See application file for complete search history.

(56) References Cited

U.S. PATENT DOCUMENTS

| | | | |
|---|---|---|---|
| 5,968,560 | A | 10/1999 | Briere et al. |
| 7,249,944 | B2 | 7/2007 | Arakelyan et al. |
| 2012/0135101 | A1 | 5/2012 | Blanchard |
| 2012/0161349 | A1 | 6/2012 | Pasquier et al. |

FOREIGN PATENT DOCUMENTS

| | | |
|---|---|---|
| EP | 0 821 641 B1 | 8/2000 |
| FR | 2 646 802 A1 | 11/1990 |
| FR | 2 659 265 A1 | 9/1991 |
| FR | 2 843 714 A1 | 2/2004 |
| MX | 2012001933 A | 3/2012 |
| WO | 96/33059 A1 | 10/1996 |
| WO | 2011/026980 A1 | 3/2011 |

OTHER PUBLICATIONS

International Search Report, dated May 30, 2012, from corresponding PCT application.

*Primary Examiner* — Jacob Thomas Minskey
(74) *Attorney, Agent, or Firm* — Young & Thompson

(57) ABSTRACT

An automated system for changing a mold of a molding unit (24) with which a machine for manufacturing containers is provided, characterized in that the system includes at least one control module (M) having at least a first actuating device (122) combined with the locking device (90) of the molding unit (24) and a second actuating device (126) combined with the opening/closing device (82) of the molding unit (24).

12 Claims, 11 Drawing Sheets

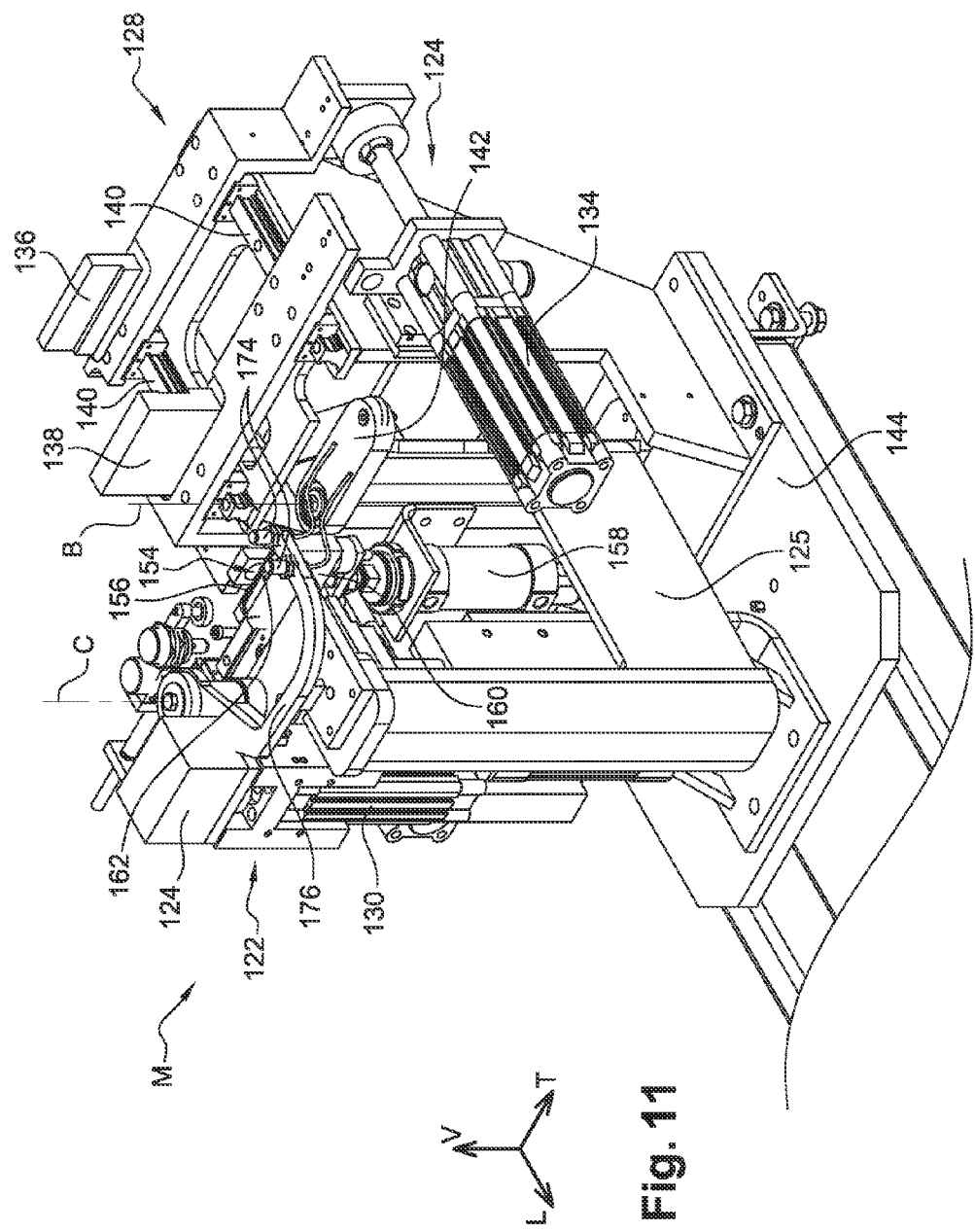

AUTOMATED SYSTEM FOR CHANGING A MOLD OF A MOLDING UNIT WITH WHICH A MACHINE FOR MANUFACTURING CONTAINERS IS PROVIDED

The invention relates to an automated system for changing a mold of a molding unit with which a machine for manufacturing containers is provided.

More particularly, the invention relates to an automated system for changing a mold of a molding unit with which a machine for manufacturing containers is provided, by forming a preform made of previously thermally conditioned plastic material, by means of at least a pressurized fluid.

In the prior art machines for manufacturing containers are known, in particular bottles made of thermoplastic material, said machines being in particular, but not exclusively, so-called "rotary" machines.

FIG. 1 represents by way of non-limiting example an installation 5 according to the prior art comprising a machine 10 of the rotary type for manufacturing containers, in which installation 5 said machine 10 (also known as a "blower") is in particular associated with an oven 12 for thermal conditioning of the preforms 14.

The installation 5 comprises a device 16 for supply of preforms 14 (or blanks) which are introduced into the installation via an input E which communicates with an input area of the oven 12.

The oven 12 comprises means 18 for heating preforms 14 which are arranged on all or part of a path, in this case in the form of a "U", which extends from the input area of the oven into which the preforms 14 are brought by the supply device 16, to an output area of the oven 12 in the vicinity of which a first transfer device 20 is arranged.

The first transfer device 20 is designed to transfer the thermally conditioned preforms 14 from the output area of the oven 12 to an area Zi, known as the area for introduction of the preforms 14 into the manufacturing machine 10.

The manufacturing machine 10 comprises a carousel 22 equipped with a series of molding units 24 which are distributed circumferentially, and blowing or drawing-blowing means (not represented), associated with said units 24.

The molding unit 24 comprises two mold holders 26 which are fitted such as to be mobile between an open position and a closed position of the molding unit, for example when the molding unit 24 is of the "book-like opening" type as illustrated in FIG. 1, the mold holders 26 (as a variant at least one of them) are fitted such as to be mobile in rotation relative to one another around an axis O of rotation.

Each molding unit 24 comprises a mold comprising at least two molding elements 28 each secured in a removable manner on one of the mold holders 26.

In the closed position of the molding unit 24, the molding elements 28 are coupled in a joined position in which their inner surfaces define a joint plane, with the bringing together of their molding half-indentations defining the volume, form, and appearance etc. of the container to be obtained by forming a preform.

A manufacturing machine 10 of this type can operate according to different operating modes.

According to one operating mode of the machine, known as the production mode, the machine 10 is used jointly with the oven 12 of the installation 5 for manufacturing containers.

In an operating mode of this type of the machine 10, the carousel 22 is rotated such that each molding unit follows a transformation cycle from said introduction area Zi to an area Ze, known as the discharge area, of the containers 14' in which a second transfer device 20' is arranged.

The second transfer device 20' is designed to transfer the containers 14' obtained from preforms 14 from the discharge area Ze of the machine 10 as far as an output S of the installation 5.

As illustrated in FIG. 1, the areas for introduction of the preforms 14 and discharge of the containers 14' are adjacent and situated in the front part of the machine 10, such that the transformation cycle is carried out on virtually all of the circumference of the machine.

The installation 5 generally comprises a protection enclosure 30 which is provided such as to surround at least the manufacturing machine 10 and the oven 12.

In the production mode of the machine 10 illustrated by FIG. 1, the manufacturing of containers made of plastic material, such as bottles, flasks, etc., is thus carried out in the molding units 24 by forming, such as by blowing or by drawing-blowing, of preforms 14 previously heated in the thermal conditioning oven 12.

However, although the production mode constitutes the main operating mode of the machine, the machine 10 also has another operating mode, known as the intervention mode, which is just as important.

In fact, said at least two molding elements 28 which form the mold and each comprise a half indentation are secured on the mold holders 26 by means of securing means (not represented) which can permit removal and fitting in order to make it possible to carry out a mold change of the molding unit 24.

Document EP-B1-0.821.641 in the name of the applicant describes different improvements made in particular on the structure of a molding unit 24, each molding element 28 being made of two parts, known respectively as the shell and the shell holder.

For further details, reference will be made to this document, which is however indicated purely by way of non-limiting example.

A mold change of this type is required in particular in order to proceed with manufacture of containers with different forms and/or dimensions, or in order to replace them in the event of damage and/or wear of the molding elements.

According to the use of the machine 10, the operating mode, known as the intervention mode, during which the production of containers by the machine is stopped, is more or less frequently implemented.

In certain cases, the mold changes are very frequent, such that even greater attention is then paid to the time necessary in order to proceed with the mold change of a molding unit 24.

However, the time required to proceed to change a mold must be multiplied by the number of molding units 24 which the machine 10 comprises, which number is for example between 6 and 34 molding units.

The operations required in order to change the mold of a molding unit 24 are numerous, and all of them are carried out manually by an operator, and sometimes two operators, such that the intervention time is often considered too long by the users, in particular in the case of frequent changes.

In fact, the immobilization of the machine 10 during these operations represents a substantial cost, because of the complete production stoppage which accompanies it, and the mold change operations, which are more or less frequent according to the users, are consequently very costly since they are lengthy and complex.

The object of the present invention is in particular to resolve the above-described disadvantages, and its objective is in particular to reduce the time necessary in order to carry out a mold change of a molding unit, whilst improving the general conditions in the intervention mode of the machine, from the point of view both of safety and ergonomics.

For this purpose, the invention proposes an automated system for changing a mold of a molding unit with which a machine for manufacturing containers is provided, said molding unit comprising:

- at least two mold holders which are fitted such as to be mobile between an open position and a closed position of the molding unit, and a mold which comprises at least two molding elements which are each secured in a removable manner on an associated mold holder by securing means;
- a device for opening and closure of the molding unit, comprising at least one control member which can displace at least one of the mold holders between said open and closed positions; and
- a locking device of the molding unit comprising at least one control member which can actuate locking means which are fitted such as to be mobile between:
- a locked position in which the mold holders of the molding unit are kept in the closed position by said locking means; and
- an unlocked position in which the mold holders are free to be displaced between the closed and open positions.

According to the invention, the system comprises at least one control module comprising at least:

- a first actuating device which, associated with the locking device of the molding unit, comprises first maneuvering means which, when the molding unit occupies a predetermined reference position relative to said module, co-operate with the control member of the locking device, in order to control the locking means selectively between said locked and unlocked positions, said first maneuvering means being fitted such as to be mobile relative to the module, between at least:
- a first position corresponding to the locked position of the locking means of the locking device of the molding unit; and
- a second position corresponding to the unlocked position of the locking means of the locking device of the molding unit,
- a second actuating device which, associated with the device for opening and closure of the molding unit, comprises second maneuvering means which are distinct from the first maneuvering means of the first actuating device and which, when the molding unit occupies said predetermined reference position relative to said module, co-operate with the control member of the device for opening and closure in order to control selectively the opening and closure of the molding unit, said second maneuvering means being fitted such as to be mobile relative to the module, between at least:
- a first position corresponding to the closed position of the molding unit; and
- a second position corresponding to the open position of the molding unit.

Advantageously, the system according to the invention comprises at least one module which can provide assistance with changing the mold of a molding unit by means of total automation of the operations implemented in order to carry out a mold change of this type.

The applicant has already proposed solutions for automating totally or partially some of the operations implemented in order to carry out a mold change of a molding unit with which a machine for manufacturing containers is provided.

European patent application no. 10174852.3 (not published) filed on 1st Sep. 2010 in the name of the applicant proposes a first design of a control module for automation of the operations of unlocking and locking and opening and closure of the molding unit during a mold change of said unit.

According to this first design, the control module can occupy at least a state of monitoring and a state of use associated with an operating mode of the machine, known as the intervention mode, in order to proceed at least with the mold change of the molding unit, and wherein said module can control selectively a locking device and an opening/closure device of the molding unit.

In this first design, the control module comprises first and second actuating devices which are associated respectively with the locking device and with the opening/closure device of the molding unit.

The control member of the locking device and the control member of the opening/closure device are actuated respectively, under the action of relative displacement, by a cam which each of said first and second devices for actuation of the module comprises, the actuation being derived from the relative displacement of the molding unit in relation to the module and in relation to the cams occupying a position of work.

In comparison, the control module according to the invention is distinguished from this first design in particular by the absence of resorting to relative displacement of this type of the molding unit in relation to the module in order to give rise to the actuation of the locking device and the opening/closure device.

In the invention, the control module comprises first and second actuating devices which are associated respectively with the locking device and with the opening/closure device of the molding unit, and first and second maneuvering means of which are fitted such as to be mobile relative to the module, in order to actuate each control member, whilst the molding unit occupies and remains in a predetermined reference position relative to the module, which also occupies a fixed position.

International patent application PCT/EP2010/070201 (not published), filed on 20 Dec. 2010 in the name of the applicant, proposes a second design of a control module which forms at least part of a system for assistance with changing a mold.

According to this second design, the control module comprises an actuating device comprising a maneuvering member which is designed to co-operate with the member for control of the locking device of the molding unit.

In this second design, the module comprises a single maneuvering member which co-operates only with the member for control of the locking means of the molding unit, firstly in order to give rise to the unlocking and locking, and secondly in order to give rise to the opening or closure of the molding unit.

In comparison, the control module according to the invention is distinguished from this second design by the fact that the actuation of the locking device and the opening/closure device of the molding unit is carried out respectively by first maneuvering means and by second maneuvering means, which second maneuvering means are distinct from the first maneuvering means.

Advantageously, the invention thus proposes a third and new design of a control module by means of which at least some of the operations, and preferably all of them, carried out in order to change a mold of a molding unit, are automated and carried out in a reduced time.

In fact, the automated system according to the invention makes it possible to eliminate any manual intervention by an operator, at least for the operations of unlocking and locking of the molding unit, as well as for the operations of opening and closure of the molding unit carried out in order to proceed to change the mold of said unit, i.e. the operations of removal and fitting of molding elements.

By means of the invention, the time necessary to implement operations of changing of the molds is considerably reduced in comparison with the time previously required in order to carry out these same operations.

Advantageously, the automated system according to the invention participates by means of the control module in the reduction of the laboriousness for the operator of operations of this type, which are tiring, repetitive, and carried out in an environment which often has poor ergonomics.

Preferably, the system comprises a number (n) of modules of two or more, such as to process simultaneously an equivalent number of molding units each associated with a module, thus further reducing the total time required for changing the molds of all or part of the molding units of a machine.

According to other characteristics of the invention:

- the first actuating device comprises at least one first actuator, in order to displace selectively between at least the first position and the second position, a first maneuvering member which forms said first maneuvering means;
- the second actuating device comprises at least one main actuator, in order to displace selectively between at least the first position and the second position, a second maneuvering member which forms said second maneuvering means;
- said second means for maneuvering the control member of the opening/closure device are constituted by a controlled gripper comprising two clamping jaws, at least one of said clamping jaws being fitted such as to be mobile relative to the other clamping jaw, between:
  - a position of rest of the gripper, in which the clamping jaws are spaced from one another; and
  - a position of work of the gripper in which said clamping jaws, brought towards one another in order to co-operate with said second control member, can displace the latter between said first and second positions;
- the second actuating device of the module comprises at least one secondary actuator, in order to displace said at least one mobile clamping jaw selectively between said positions of rest and work of the gripper;
- the control module comprises connection means which can connect the first maneuvering means of the first actuating device in displacement with the second maneuvering means of the second actuating device;
- the connection means are constituted by at least one connecting rod, one end of which is connected to the first maneuvering means of the first actuating device, and the other end of which is connected to the second maneuvering means of the second actuating device;
- the control module comprises a third actuating device which, associated with the securing means, controls the securing means selectively in order to give rise to a change of state corresponding to the release or securing, on the associated mold holder, of each of said at least two molding elements of the mold;
- the third actuating device associated with the securing means comprises at least one actuator which can co-operate, when the molding unit occupies the closed position, with at least one actuating member of the securing means, associated with one of said molding elements, in order to control the displacement of the securing means between at least one securing position and one released position;
- the control module comprises a fourth actuating device which, associated with means for supporting a mold base which is complementary with said at least two molding elements of the mold, can give rise selectively to the separation of said mold base and the associated support means or assembly of said mold base and the associated support means;
- the fourth actuating device comprises at least maneuvering means which are moved by an actuator in order to displace selectively said support means, respectively between a high position and a low position, in order to give rise selectively to the separation or assembly between the mold base and the associated support means;
- the control module comprises control means which can check that a mold base which is complementary with said at least two molding elements of the mold, is correctly locked by locking means which intervene between the mold base and the associated support means;
- the control module comprises a fifth supply device, comprising energy supply means which can supply energy selectively for actuation of the means for securing of the molding elements and/or for actuation of the means for locking the mold base with the associated support means;
- the supply means can supply energy selectively to the third control device associated with the securing means, in order to supply with energy at least one actuator which, when the molding unit occupies the closed position, can act on at least one actuating member of the securing means associated with one of said molding elements, in order to control the displacement of said securing means between at least one securing position and one release position;
- the supply means can supply energy selectively to the means for locking the mold base, in order to give rise to the displacement of an actuating member which can give rise to a change of state of the locking means between a locked position and an unlocked position;
- the energy supply means are fitted such as to be mobile between at least:
  - a supply position, in which said supply means, connected to a source of energy, are connected to the molding unit such as to be able to supply energy;
  - a standby position, in which the supply means, which are physically separated from the molding unit, are unable to supply energy;
- the energy supply means comprise at least one sealed connection means which is fitted such as to be mobile between the standby position and the supply position in which said connection means co-operate with a complementary connection means which, integral with the molding unit, can connect to the source of energy at least one actuator of the control device of the controlled means for securing and/or the means for locking of the mold base with the associated support means;
- the control module comprises a sixth control device which, associated with the means for securing of the molding elements of the mold, can control the securing by the means for securing, of said at least two molding elements of the mold on the associated mold holders;
- the sixth control device comprises control means which, constituted by at least one sensor, can detect the position occupied by a mobile part which said at least one actuator comprises, such as to check, according to the position occupied by said mobile part, that said securing means occupy the locked position;

the control means can occupy at least one inactive state and one active state in which said control means can determine the position occupied by said securing means;

the control means are integral with at least one support arm which, controlled in displacement by an associated actuator, is fitted such as to be mobile between at least:

a control position, corresponding to the active state, in which said control means are positioned relative to said associated actuators on the securing means, in order to determine the position occupied by said securing means; and a retracted position, corresponding to the inactive state, in which the associated actuator and the support arm of the control means are retracted in order not to interfere with the molding unit;

the control module comprises stop means which can intervene selectively in order, before the closed position is reached, to block the molding unit temporarily in a given intermediate position for which the securing means can occupy a position, known as the pre-securing position, which corresponds to a position in which the securing means are partially engaged, without the securing position of the molding elements having been reached;

the stop means are fitted such as to be mobile between at least:

a retracted position in which the stop means do not interfere with the second maneuvering means of the control member of the opening/closure device, which are free to be controlled in displacement between the first and second positions; and a deployed position in which the stop means can co-operate with the second maneuvering means, in order to block the molding unit temporarily in said given intermediate position, in which the means for securing the molding elements can occupy said pre-securing position;

the control module of the system can occupy at least:

a state of monitoring associated with an operating mode of the machine, known as the production mode, for the manufacture of containers by the machine; and a state of use associated with another operating mode of the machine, known as the intervention mode, in which said module can control selectively at least the locking device and the opening/closure device of the molding unit, in order to automate at least the actuation of the control members of said devices during the mold change of a molding unit;

at least the actuators of said first and second actuating devices constitute means for a change of state of the control module, between the state of monitoring and the state of use;

the system comprises a control unit which can control said at least one control module by controlling in a synchronized manner, according to a predetermined sequence, at least the actuators of the first and second devices of said control module, in order to carry out automatically all or part of the mold change operations of a molding unit;

the system comprises at least two control modules which are controlled, simultaneously or in succession, by at least one control unit, in order to carry out a mold change cycle without changing predetermined reference positions of the associated molding units.

Other characteristics and advantages of the present invention will become apparent from reading the following detailed description, for understanding of which reference will be made to the drawings, in which:

FIGS. 10 and 11 are three-quarter views in perspective, illustrating partially the molding unit and the module in one case, and the control module only in the other case.

Hereinafter in the description, by way of non-limiting example, the longitudinal, vertical and transverse orientations will be adopted with reference to the trihedron (L, V, T) represented in the figures.

By convention, the longitudinal and transverse directions are determined in a fixed manner relative to the axis of the mold holders, such that the open or closed position occupied does not affect said orientations.

Also in a non-limiting the manner, the terms "front" and "rear" will be used with reference to the longitudinal orientation, and "upper" and "lower" or "top" and "bottom" will be used with reference to the vertical orientation, and finally "left" or "right" will be used with reference to the transverse orientation.

Figure 1:
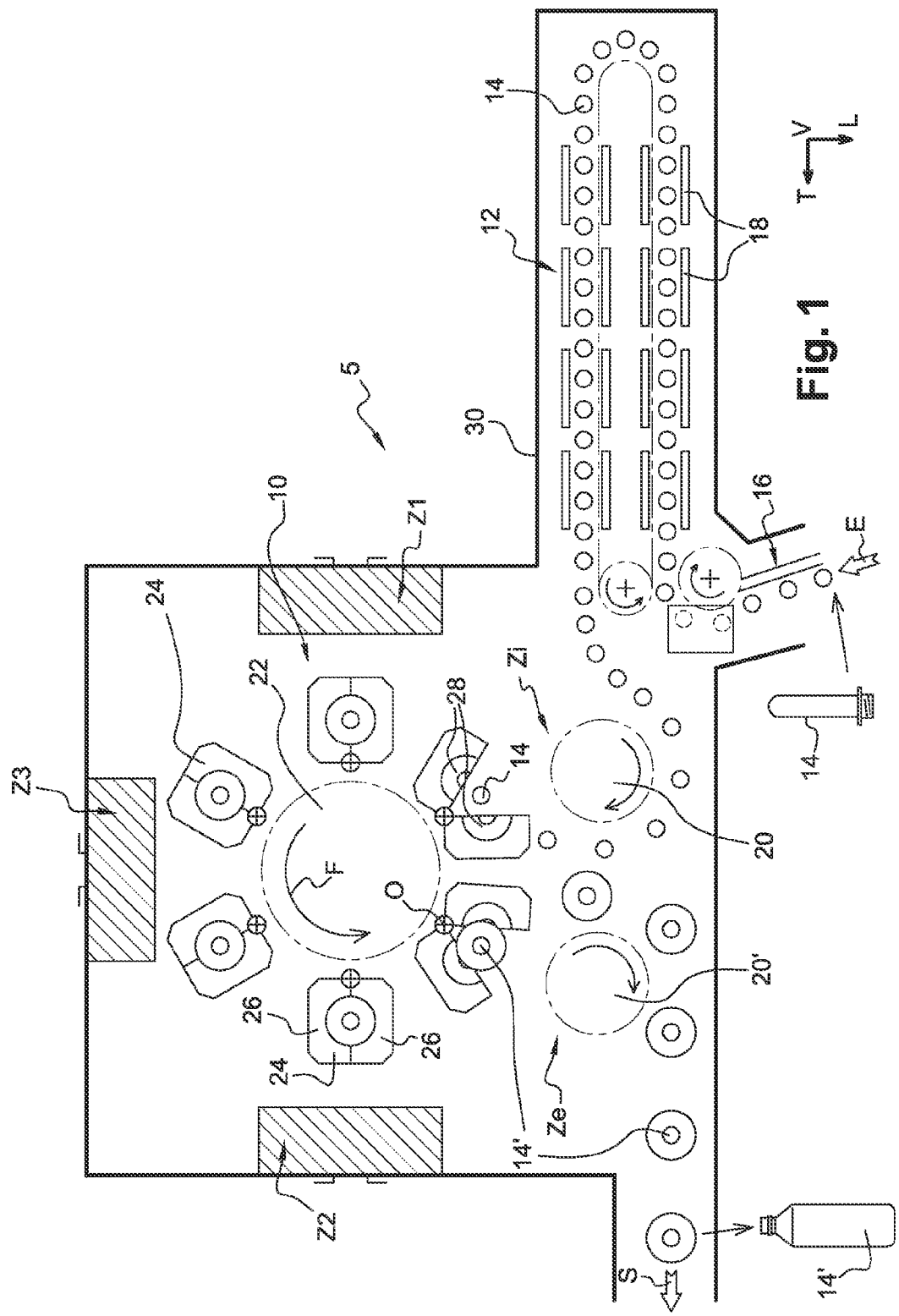
FIG. 1 is a plan view which represents schematically an installation according to the prior art, comprising an example of a machine for manufacturing containers, which, according to the invention, can be equipped with an automated system comprising at least one control module for the mold change of a molding unit.
Figure 2:
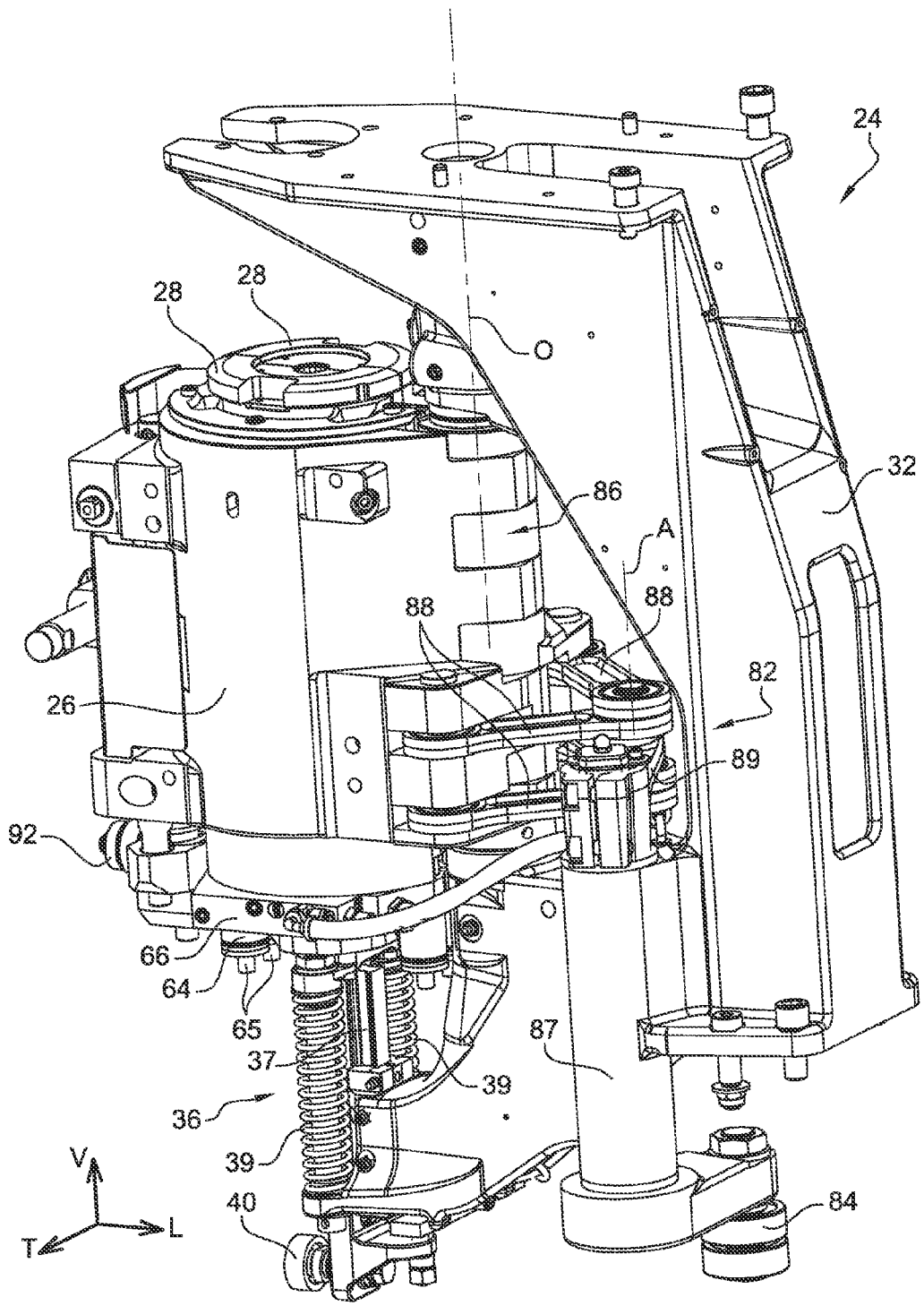
FIGS. 2 to 4 are views in perspective which represent an exemplary embodiment of a molding unit which is designed to equip one of the stations of a machine according to FIG. 1, said unit being illustrated respectively in a three-quarter rear view in the closed position, in a front view in the open position, and in a three-quarter view in the open position with a whole mold extracted.
Figure 3:
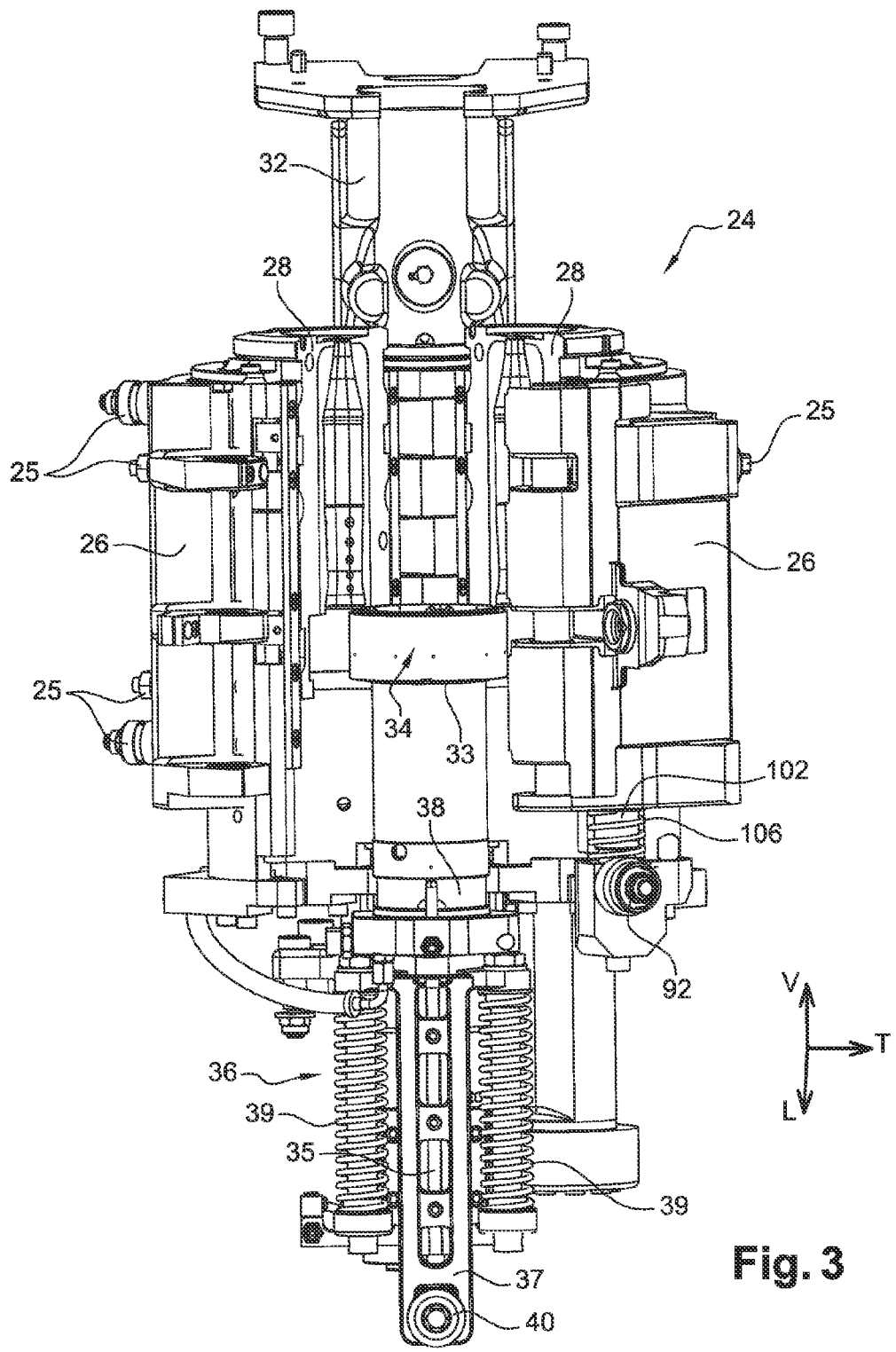

FIGS. 2 and 3 represent an exemplary embodiment of a molding unit 24 which can be fitted on a carousel 22 of a machine 10 for manufacturing containers of the type represented in FIG. 1 and described in the preamble in relation with the operating modes of the machine 10.

However, the molding unit 24 which will be described constitutes only an exemplary embodiment provided by way of non-limiting example.

A molding unit 24 of this type constitutes one of the stations for forming by blowing or by drawing-blowing of the machine 10 which comprises a series of "n" molding units 24, distributed angularly, regularly, with a predetermined pitch, around the carousel 22 of the machine 10.

The forming of the container from a preform is obtained by means of at least a pressurized fluid. In the embodiment, the forming is preferably carried out by blowing or by drawing-blowing, using pressurized air.

Reference will be made for example to document FR-2.764.544 for further details on blowing means, also known as a "blowing nozzle" which can be associated with a molding unit 24.

As represented in FIG. 1, the machines, known as rotary machines, are equipped with molding units 24 with specific characteristics. In particular, each molding unit 24 comprises mold holders 26 which are generally fitted such as to be mobile around an axis of rotation (and not in translation as for "linear" machines).

The molding unit 24 comprises two mold holders 26, which are fitted such as to be mobile relative to one another between an open position and a closed position of the molding unit.

The molding unit 24 is supported by a console 32 designed to be secured on the carousel 22 of the machine 10. More specifically, the mold holders 26 are constituted in the form of two bearing structures which are fitted such as to pivot around the axis O of rotation, the axis O of rotation in this case extending vertically according to the trihedron (L, V, T).

Thus, the mold holders 26 of the molding unit 24 are fitted such as to be mobile around an axis O of rotation with vertical orientation, such that the molding unit 24 opens towards the exterior of the carousel 22 of the machine, in order to permit the introduction of a preform 14 or the extraction of the container 14' in the operating mode known as the production mode.

As a result of these kinematics, a molding unit 24 of this type is said to have a "book-like opening".

As a variant, only one of the mold holders 26 is fitted such as to be mobile, whereas the other mold holder 26 is fixed, the displacement of the mobile mold holder 26 being controlled between said open or closed positions.

As can be seen in FIG. 3 which illustrates the molding unit 24 in the open position, the molding unit comprises a mold comprising at least two molding elements 28, each provided with a half indentation (which can be seen in each half mold present and in the position secured on the mold holder 26).

Specific features characterize a molding unit 24 of this type with a "book-like opening" and affect the mold change directly.

Thus, the accessibility to the molding elements 28 is limited because of the slight spacing of the mold holders 26 in the open position, which is determined relative to the final container to be extracted from the mold during the manufacture.

In addition, in a machine 10, the spacing of the mold holders 26 in the open position is also limited by the spacing between the molding units 24, in other words for a given molding unit 24 for each of the adjacent molding units 24 situated upstream and downstream, since two consecutive molding units 24 cannot occupy the open position simultaneously without their mold holders coming into contact.

When the container 14' to be manufactured has a base with a complex form, in particular a petaloid base, it is known for problems of removal from the mold then to be able to take place. This is why a mold base is advantageously provided which is separate from the molding elements.

In the exemplary embodiment represented, the mold comprises respectively three distinct elements, i.e. two molding elements 28 and a mold base 34 comprising an indentation in the base of the container which is complementary with the half indentations which said molding elements 28 comprise.

As a variant, the mold comprises only two molding elements 28, without a mold base of this type.

In a known manner, the mold base 34 is fitted on support means 36 comprising in particular a seat 38 which forms an interface part with the mold base 34, and comprises locking means (not represented) which are designed to permit securing in a removable manner of the mold base 34.

Advantageously, the seat 38 also comprises other fluid connection means, such as rapid connections, in particular in order to ensure a cooling function of the mold base 34, or a function of detachment of the mold base 34 by projection of a jet of air.

The seat 38 is fitted at the upper end of the support means 36, which for example are produced in the form of a carriage.

The support means 36 are fitted such as to be mobile respectively between at least a high position and a low position, in translation according to the vertical direction.

In the operating mode known as the production mode, the high position of the support means 36 corresponds in particular to the position occupied by the mold base 34 for forming of a container 14', whereas the low position corresponds to the position occupied by the mold base 34 after the forming, when the container 14' is extracted from the mold.

The mold base 34 can be displaced by the associated support means 36, which occupy in succession said high position and low position, according to a sequence determined during the manufacturing cycle.

In the operating mode known as the intervention mode, the mold base 34 and the associated support means 36 are controlled according to another sequence which is determined according to the mold change cycle.

The support means 36 comprise at least one control member 40, which is designed to control selectively the displacement, between the high and low positions, of the mobile equipment formed by the support means 36 and the seat 38 onto which said mold base 34 is or is not secured.

Preferably, the control member 40 for the support means 36 is a roller which is integral with a part 35 fitted such as to slide, according to the vertical direction, relative to the console 32, for example by means of a slide 37.

Preferably, the support means 36 comprise resilient return means 39 such as springs, which can return the support means 36 automatically to said high position.

In the operating mode known as the production mode, the control member 40 is designed to co-operate with a complementary cam (not represented) which the machine comprises, said cam being designed to control selectively the displacement of the means 36 for support of the mold base 34 from the high position to the low position, in particular during removal from the mold, i.e. extraction from the container 14'.

Preferably, the locking means (not represented) of the mold base 34 and of the seat 38 consist of controlled locking means wherein the locking means are of the "ball" type.

The mold base 34 comprises for example a locking tail which, whilst extending vertically below and in a direction opposite the petaloid indentation of the base, is designed to be received in a complementary central receptacle of the seat 38.

Advantageously, the locking tail comprises at least one notch, forming a female element, which can receive the balls, forming a male element, of the locking means, when the mold base 34 and the seat 38 are assembled.

The means for locking the mold base 34 with the seat 38 are fitted such as to be mobile respectively between at least:
- a locking position in which the balls penetrate in the notch of the locking tail, such as to immobilize the mold base 34 relative to the seat 38; and
- an unlocking position in which the balls are free, such as to permit the separation of the mold base 34 and the seat 38.

Preferably, the displacement of the locking means with balls is controlled selectively between said locking and unlocking positions by an actuating member which is for example in the form of a piston which can be moved by a fluid such as pressurized air received in a control chamber associated with the locking means.

The piston which forms the actuating member is fitted such as to be mobile in a cylinder, and delimits said control chamber together with the cylinder.

The piston is fitted such as to be mobile between at least one blocking position corresponding to the locking position of the balls, and a release position corresponding to the unlocking position.

Preferably, the piston is fitted such as to be mobile against resilient return means which are designed to return the piston automatically to its blocking position, and consequently return the balls to the locking position.

In fact, the piston advantageously co-operates with the balls in the blocking position, such as to block in position the balls which are engaged in the annular notch in the locking tail, by means of which the balls are immobilized in a direction which is at right angles to the vertical direction according to which the separation is carried out, and any accidental unlocking is impossible.

By means of the automatic return of the piston to the blocking position, the locking means are advantageously controlled only in order to obtain the unlocking.

For this purpose, pressurized air is introduced into the sealed control chamber in order, against the resilient return means, to give rise to the displacement of the piston from the blocking position to the release position, in which the piston remains until the force exerted on the piston by the pressurized air contained in the chamber is greater than the return force, in the opposite direction, exerted on the piston by the resilient return means.

Since the piston then occupies the release position, the balls of the locking means are free to be displaced from the locking position to the unlocking position.

Preferably, the displacement of the balls from the locking position to the unlocking position is caused by co-operation of forms with a part of the locking tail, when said tail is displaced vertically in the complementary receptacle of the seat 38.

Thus, the introduction into, or the extraction from the receptacle of the seat 38 of the locking tail which is integral with the mold base 34, is possible only if the piston occupies its release position, since only then are the balls free to be displaced to the unlocking position.

Consequently, the chamber for control of the locking means must be supplied with air in order to establish a pressure greater than the return force, such as to keep the piston in the release position, by means of which it is then possible to carry out the separation or the assembly of the mold base 34 and the seat 38 which is connected in displacement to the support means 36.

It will be appreciated that both the above-described locking means with balls and the associated control means constitute only a non-limiting example for carrying out the locking function between the mold base and the seat 38 integral with the mobile support means 36.

In addition, irrespective of whether the mold is made of two or three elements with a mold base 34 such as in the present exemplary embodiment, the design of the two molding elements 28 can also differ, depending in particular according whether or not the molding element includes other functions such as cooling of the mold, as well as the fact of comprising part of the indentation of the container.

Documents FR-2.659.265 or FR-2.843.714 illustrate exemplary embodiments of a molding unit 24 with a book-like opening, comprising a mold constituted by at least two molding elements 28 (or half molds), which, provided respectively with a molding half-indentation, are secured in a removable manner on two mold holders 26 associated by means of securing means.

In document FR-2.659.265, the associated securing means formed by screws can be maneuvered between at least two positions, corresponding respectively to a securing state and a release state of the molding elements, carried out manually by at least one operator using for this purpose an appropriate tool (screwdriver, hexagonal spanner, etc.).

Document WO-96/33059 illustrates another exemplary embodiment of a molding unit with a book-like opening comprising different improvements.

In comparison with that of the aforementioned document FR-2.659.265, the structure of the mold of the molding unit 24 differs in particular in that each molding element (or half mold) is divided into two distinct parts, i.e., and according to the terminology of this document, firstly a shell holder which additionally incorporates cooling means, and secondly a shell comprising a molding half-indentation of the container.

Shells of this type are more easily manipulated by hand by an operator because of their lower weight, they do not require disconnection of the fluid connections associated with the cooling function, and they make it possible to optimize the choice of materials for each of the parts according to the function carried out, for example aluminum for the shells.

Figure 4:
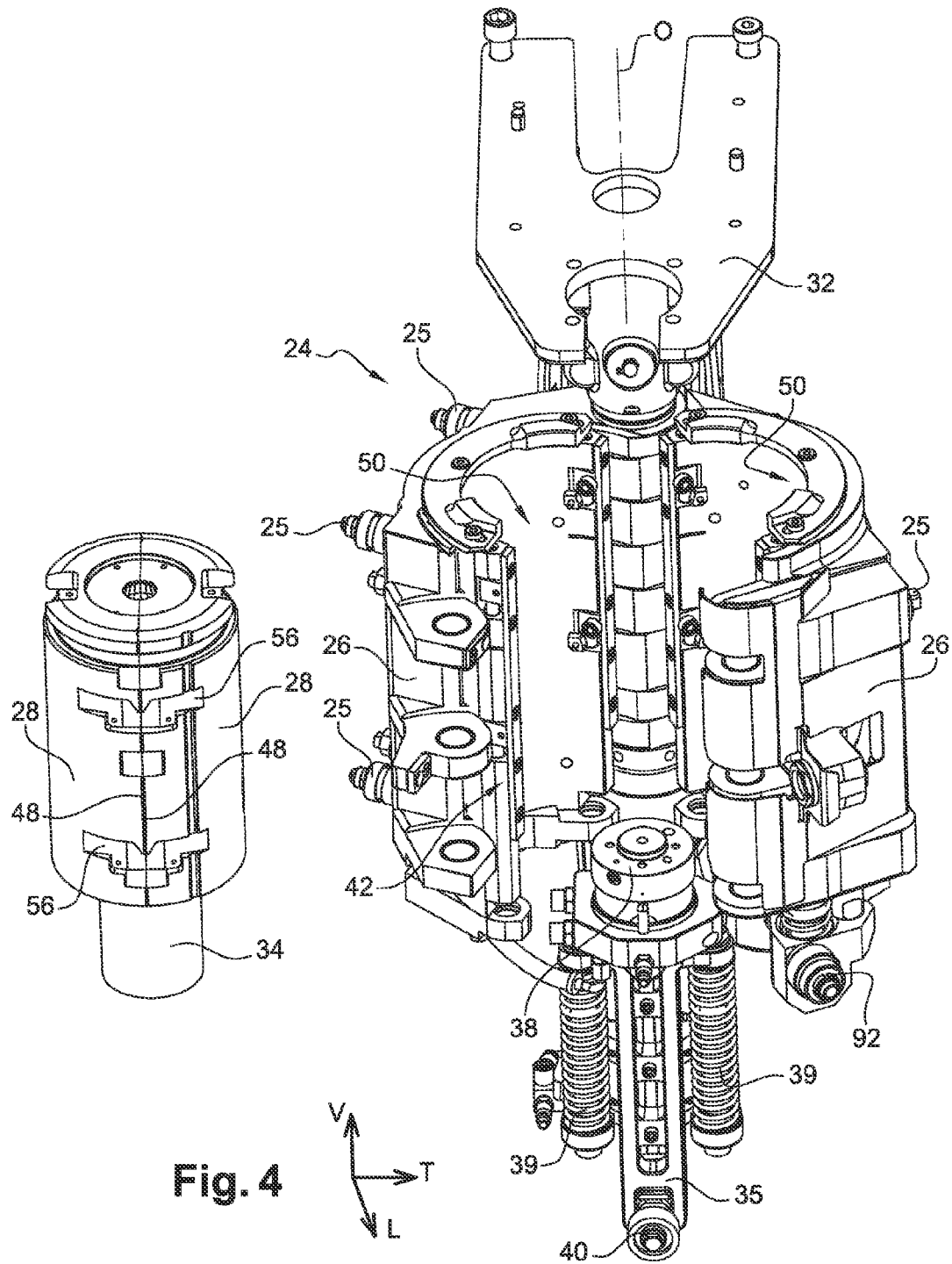

In the exemplary embodiment of the molding unit 24 represented in FIGS. 2 to 4, the mold of the molding unit 24 structurally has a design similar to that described in document WO-96/33059.

Each molding element 28 of the mold thus comprises respectively a shell and an associated shell holder according to the teaching of this document, to which reference will be made for greater details.

As in this document, each of the shell holders can be secured in a removable manner on an associated mold holder 26 by means of first securing means 25 such as screws and/or bolts, whereas the shell can be secured in a removable manner on the shell holder by means of other securing means 42, known as rapid means, distinct from the securing means 25 which act between the mold holder and the shell holder.

Consequently, the term "molding element 28" is used in a generic manner in the present description, and incorporates in particular the different variant embodiments of a mold, and in particular those described hereinafter, according to which each molding element 28 comprising the half indentation is either a half mold, or consists of a shell and a shell holder.

In the exemplary embodiment of the molding unit 24 represented in FIGS. 2 to 4, the molding element 28 is advantageously produced in two parts in the form of a shell and an associated shell holder, however the securing means 42 are different from the securing means of the shells described and represented in document WO-96/33059.

In fact, the securing means of document WO-96/33059 require firstly the manual intervention of an operator, and secondly they require that the molding unit occupy the open position in order to allow the operator to gain access to it.

The shell holders are secured respectively in a removable manner on the mold holders 26, for example by securing means 25 such as screws, but advantageously remain secured to the mold holders 26, with only the shells comprising the half indentation being changed during a mold change.

In order to reduce further the time necessary to release and secure each molding element 28 during a mold change, i.e. in this case the shell relative to the shell holder, the applicant has invented new means 42 for securing of the molding elements.

Advantageously, the means 42 for securing the molding elements 28 are produced according to the teaching of patent application PCT/EP2010/063051 filed on 6 Sep. 2010 in the name of the applicant.

However, patent application PCT/EP2010/063051 constitutes only a preferred exemplary embodiment of securing means 42 of this type, according to a design of a mechanical type.

As a variant, the securing means associated with the molding elements 28 are produced according to the teaching of French patent application no. 0956074 filed on 7 Sep. 2009 in the name of the applicant, which describes means for securing by attraction, which are formed by controlled aspiration means which can give rise to a sucker effect which can fix each molding element 28, received in a complementary receptacle, on the mold holder 26.

Preferably, the molding unit 24 comprises means 42 for securing each molding element 28 on the associated mold holder 26, which are produced according to the teaching of patent application PCT/EP2010/063051.

The securing means 42 can secure each molding element 28 (in this case a shell) in a removable manner on the associated mold holder 26 (in this case a shell holder secured on the mold holder), and can be seen in FIG. 4, illustrating a molding unit 24 in the open position, and the mold of which has been removed.

Figure 5:
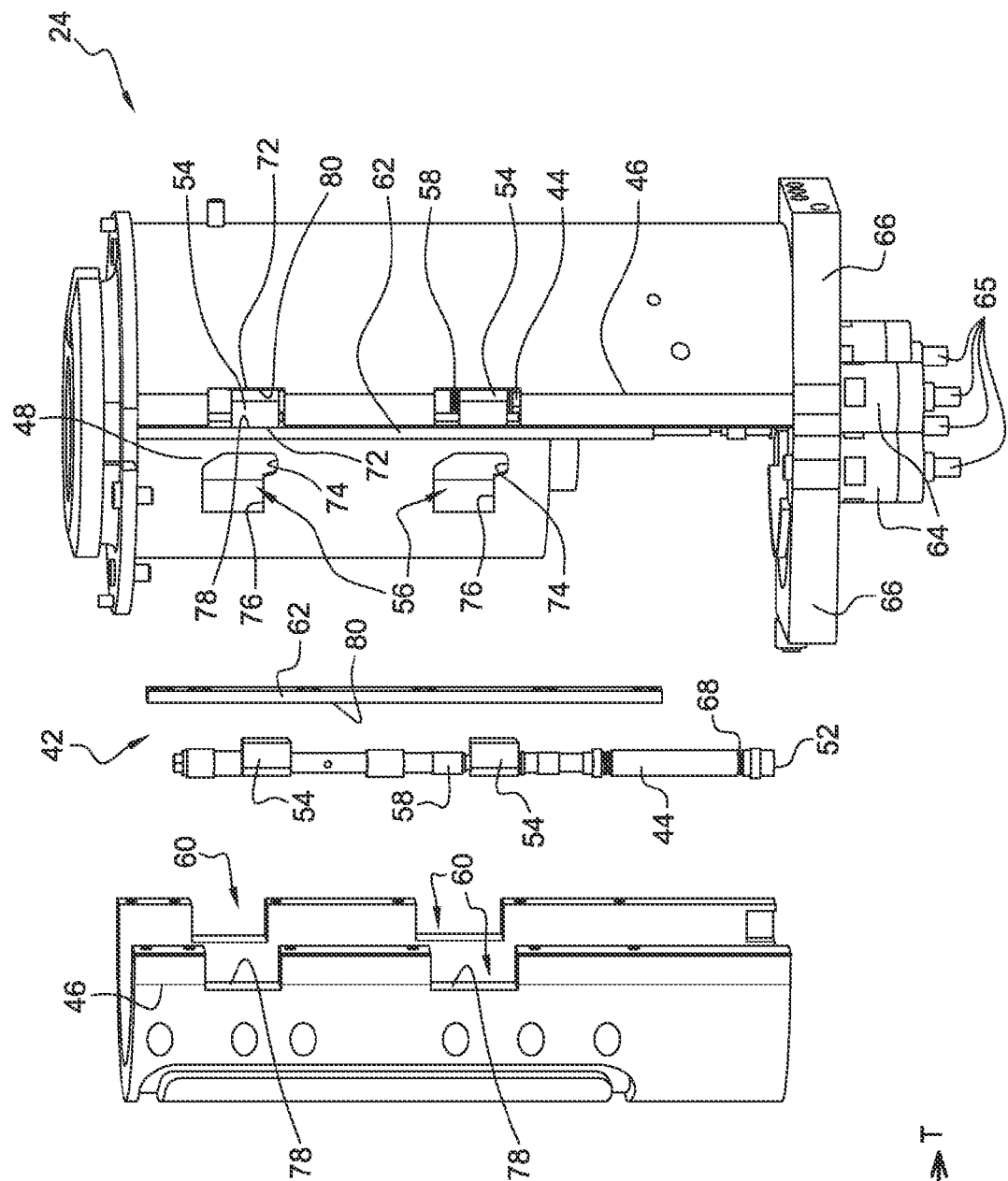
FIGS. 5 and 6 are views in perspective which represent, partly in exploded view, the means for securing the molding elements of the mold, and a detailed view of the securing means.
Figure 6:
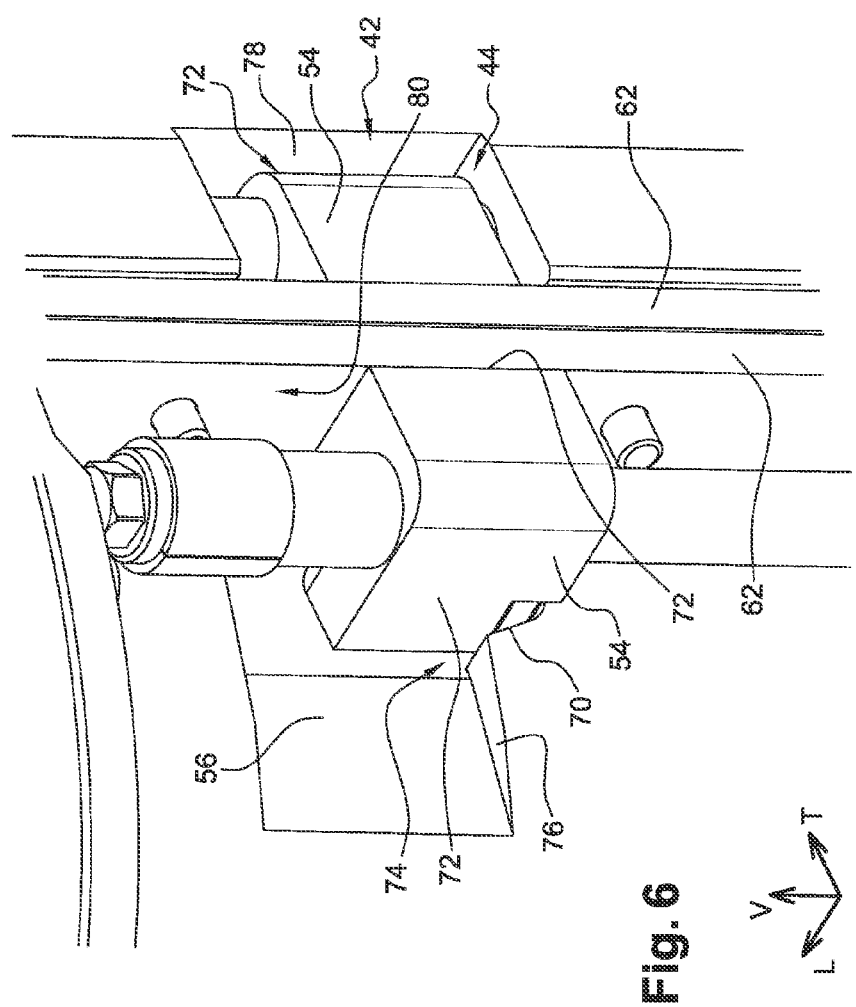

The securing means 42 according to a preferred exemplary embodiment are represented in detail in FIGS. 5 and 6.

The advantages provided by the securing means 42 produced according to the teaching of patent application PCT/EP2010/063051 are independent from the structure of the mold. In fact, said securing means can be used equally well for securing a shell on a shell holder, and a half mold on a mold holder.

In the exemplary embodiment represented in FIGS. 2 to 4, the means 42 for securing each molding element 28 on the mold holder 26 thus correspond respectively to a shell secured in a removable manner by said securing means 42 on an associated shell holder, which shell holder is secured in a removable manner on an associated mold holder 26, in this case by screws and bolts 25.

In the same way that the term "molding element 28" is used generically in the present description, for the sake of simplification hereinafter the term "mold holder" will also be used generically, since the advantages of the securing means 42 which will be described are independent from the structural design of the molding unit 24.

Thus, the term "mold holder" must be understood as designating equally well firstly a mold holder associated with a half mold which forms the molding element 28, i.e. the case of a molding unit 24 with a design similar for example to that of document FR-2.659.265, and secondly a subassembly formed by a mold holder on which a shell holder is secured, since the shell constitutes the molding element 28 which is removed and changed, i.e. the case of the present exemplary embodiment and of the aforementioned document WO-96/33059.

The securing means 42 can occupy selectively at least one securing state and one release state, and, produced according to application PCT/EP2010/063051, the securing means 42 are fitted such as to be mobile between at least one securing position and at least one release position.

According to an important characteristic, the securing means 42 can be controlled selectively between said securing and release positions when the molding unit 24 is in the closed position.

For further details on the different embodiments and the advantages of such securing means 42, reference will be made to international application PCT/EP2010/063051.

The securing means 42 comprise at least one actuating member 44, which can slide in order to control the securing means 42 in displacement between said securing and release positions.

The actuating member 44 of the securing means 42 can be controlled from the exterior of the molding unit 24, in order to give rise to the release or the securing of each molding element 28 relative to the mold holder 26, irrespective of whether the position of the molding unit 24 is open or closed.

Preferably, the securing means 42 are at least partly integrated in the interior of each of the edges 46 of the mold holder 26 (in this case the shell holder) of the molding unit 24, and can advantageously secure the molding element 28 on both of its edges 48 with vertical orientation, which, on both sides of the half indentation, are respectively parallel to the axis O of rotation.

Thus, each molding element 28 comprises means 42 for securing on each of its edges 48, by means of which said element 28 is secured in a receptacle 50 of the mold holder 26 (in this case of the shell holder).

The securing means 42 comprise respectively at least one securing element which is integral with each molding element 28, and at least one other securing element, which is complementary with said element, and can be displaced by the actuating member 44.

Advantageously, the actuating member 44 comprises a control part 52 which can be actuated from the exterior of the molding unit 24 occupying the closed position.

Preferably, said at least one securing element which is integral with each molding element 28 is a securing element 56 of a female type, such as a notch, and said at least one other securing element connected to the actuating member 44 is a securing element 54 of the male type, such as a lug.

Securing means 42 of this type correspond more particularly to the third embodiment described in international application PCT/EP2010/063051.

As a variant, the securing means 42 are for example produced according to the first embodiment of the application, wherein the securing elements 54 and 56 are inverted, with the actuating member 44 comprising hooks, which form a securing element of the female type, whereas the molding element (the shell) comprises pins, which form a securing element of the male type.

Preferably, each actuating member 44 comprises at least two securing elements 54, one of which is connected to said unit 44 with interposition of a resilient member in order to form a connection with play which can guarantee the good positioning of each element 54 relative to the other element 54.

An actuating member 44 is supported by each of the two edges 46 of each mold holder 26 (in this case the shell holder), in a receptacle 60 of which the actuating member 44 is fitted such as to slide, in this case according to the vertical direction.

The receptacle 60 is opened transversely and closed by a detachable closure element, such as a plate 62, which is secured on the edge 46, for example by being screwed, in particular in order to permit both the fitting and retention in place of the actuating member 44.

The displacement of the actuating member 44 can be controlled selectively between said securing and release positions, by means of an actuating device.

Advantageously, each actuating member 44 of the securing means 42 has its own associated actuating device which consists of an actuator 64.

Preferably, the actuator 64 is a pneumatic jack, and as a variant a hydraulic jack or an electric motor.

In the exemplary embodiment, each actuator 64 is permanently fitted on a lower surface of a console 66 made of two parts, connected respectively to the mold holders 26, such that said actuators 64 are on board the molding unit 24.

Each actuator 64 can be controlled in order to make the actuating member 44 which is associated with it slide selectively between the securing and release positions.

Advantageously, the actuators 64 are controlled simultaneously in order to release or secure said molding elements 28, whilst the molding unit 24 is in the closed position.

Preferably, the actuating member 44 of the securing means 42 supports the first securing elements 54 constituted by elements of the male type, whereas the second securing elements 56, which are complementary with the first elements 54, are supported by the molding element 28.

Preferably, the actuating member 44 comprises a resilient return member 68 which can return automatically the actuating member 44, to which there are connected the first securing elements 54, to the securing position in which each first element 54 co-operates with a second element 56, in order to ensure the securing of the molding element 28.

The function of locking in position of the actuating member 44 can be ensured by the actuator 64.

Advantageously, an actuator 64 of the single-effect pneumatic jack type can ensure the locking of the actuating member 44 in the release position, with the actuator 64 exerting on the control part 52 of the actuating member 44 a force which is greater than the force of the spring which forms the resilient return member 68.

Preferably, each actuating member 44 comprises at least two first securing elements 54 of the male type, and means for elimination of play, such as a spring 58, are provided between one of the elements 54 and the actuating member 44.

FIG. 6 represents a detailed view of the securing means 42 previously illustrated in FIG. 5, the securing means 42 being represented in the securing position, whilst the molding unit 24 is in the closed position.

The first securing element 54, which in this case is the upper element, supported by the actuating member 44, has a globally parallelepiped form.

Preferably, the first element 54 comprises mainly a locking lug 70 and two lateral blocking surfaces 72. The locking lug 70 has a curved profile, globally in the form of a "V", which is received in a complementary receptacle 74 of the notch which forms the second securing element 56 provided in the molding element 28.

The notch 56 also comprises a globally flat horizontal surface 76 along which the locking lug 70 passes when the first securing element 54 is displaced with the actuating member 44 moved by the actuator 64 between the securing and release positions, corresponding to the introduction of the lug 54 into the notch 56, or its extraction from the notch 56.

When the first element 54 co-operates with the second element of the securing means 42, in order to keep the molding element 28 in position, the molding element 28 which opposes the forces applied by the securing means 42 exerts on the latter, and more particularly on the actuating member 44, by means of the first elements 54 which are connected to it, forces which tend to give rise to movement of rotation, and consequently torsion stresses.

Advantageously, means for blocking in rotation are provided in order to block the rotation of the actuating member 44, so as to oppose said torsion forces which put the actuating member 44 under stress.

Preferably, the securing means 42 comprise means for blocking in rotation which can block the first securing elements 54 which are supported by the actuating member and are integral in rotation with the latter, in order to neutralize said torsion forces which otherwise would be applied to the actuating member 44.

Preferably, the means for blocking in rotation of the actuating member 44 are constituted by the opposite vertical surfaces 72 of each first element 54, which, in the securing position, co-operate respectively with a support surface 78 of the edge 46 adjacent to the receptacle 60, and with a portion of a surface 80 of the element formed by the plate 62.

Advantageously, a part 72 of the means for blocking in rotation of the actuating member 44 is connected in displacement to said unit 44, and can co-operate with another part 78, 80 which is integral with the mold holder 26.

In comparison with the securing means described in document WO-96/33059, the above-described securing means 42 make it possible in particular to automate the control between the positions of securing and release, by using actuators 64 associated with the actuating members 44 of the securing means 42.

Advantageously, the securing means 42 make it possible to release (or secure) the molding elements 28, whilst the molding unit 24 is in the closed position, by means of which a whole mold as represented in FIG. 4 can be extracted in the form of a transportable unit subassembly, in particular by grasping means which can advantageously be displaced by a robotized arm, as described in international application PCT/EP2010/063051.

The molding unit 24 comprises a device 82 for opening and closure of the molding unit 24, comprising at least one control member 84 which can displace at least one of the mold holders 26 between said open and closed positions.

Each mold holder 26 comprises articulation means 86 forming a hinge, which are arranged according to the longitudinal direction, at the rear of the molding unit 24, and determine the axis O of rotation around which the mold holders 26 pivot between the open and closed positions.

In order to control the displacement, the opening/closure device 82 comprises connecting rods 88, in this case respectively a pair of connecting rods 88 associated with each of the mold holders 26. A first end of the connecting rods 88 is connected to one or the other of the associated mold holders 26, whereas the other end of the assembly of the connecting rods 88 is connected to a common axis of articulation A.

Depending on whether the common axis of articulation A is displaced according to the longitudinal direction from the rear forwards, in order to bring it towards the axis O of rotation, or on the other hand from the front rearwards, in order to space it from this axis, spacing of the mold holders 26 from one another, i.e. opening of the molding unit 24, is obtained, or on the contrary bringing the mold holders 26 towards one another, i.e. closure of the molding unit 24, is obtained.

The mold holders 26 can thus be spaced from one another by pivoting respectively around the axis O of rotation, between at least one closed position and one open position.

In order to control this movement of the common axis of articulation A, use is made of actuating means which can act on the control member 84, such as at least one roller.

In the operating mode known as the production mode, the actuating means consist for example of at least one cam which is designed to co-operate with the roller which forms the control member 84, in order to control selectively the opening and closure of the molding unit 24.

Preferably, a control arm 89 which forms a lever is interposed between the control member 84 and the common axis of articulation A, in order to form a course amplifier, one end of said arm 89 being connected to the common axis of articulation A, and the other end being connected to the control member 84 by means of a shaft 87.

Reference will be made for example to document FR-2.843.714 for further details on a device 82 of this type for opening/closure of a molding unit.

The molding unit 24 comprises a locking device 90 of the molding unit 24, comprising at least one control member 92 which can actuate locking means of the molding unit 24.

The locking device 90 is arranged in the front part of the molding unit 24, i.e. longitudinally opposite the axis O of rotation and the opening/closure device 82.

The locking device 90 is designed to ensure locking of the two mold holders 26 in the closed position of the molding unit 24.

The locking means of the locking device 90 comprise for example two half locks respectively of the male and female type, which are associated with the mold holders 26, and can co-operate with one another in order to keep the molding unit 24 in the closed position.

Thus, the locking device 90 has the function in particular of preventing any unintentional opening in production, during operations of transformation by forming of the preform 14.

By way of indication, it will be remembered that for forming by blowing or drawing-blowing, the final blowing pressures can reach 40 bars.

Figure 7:
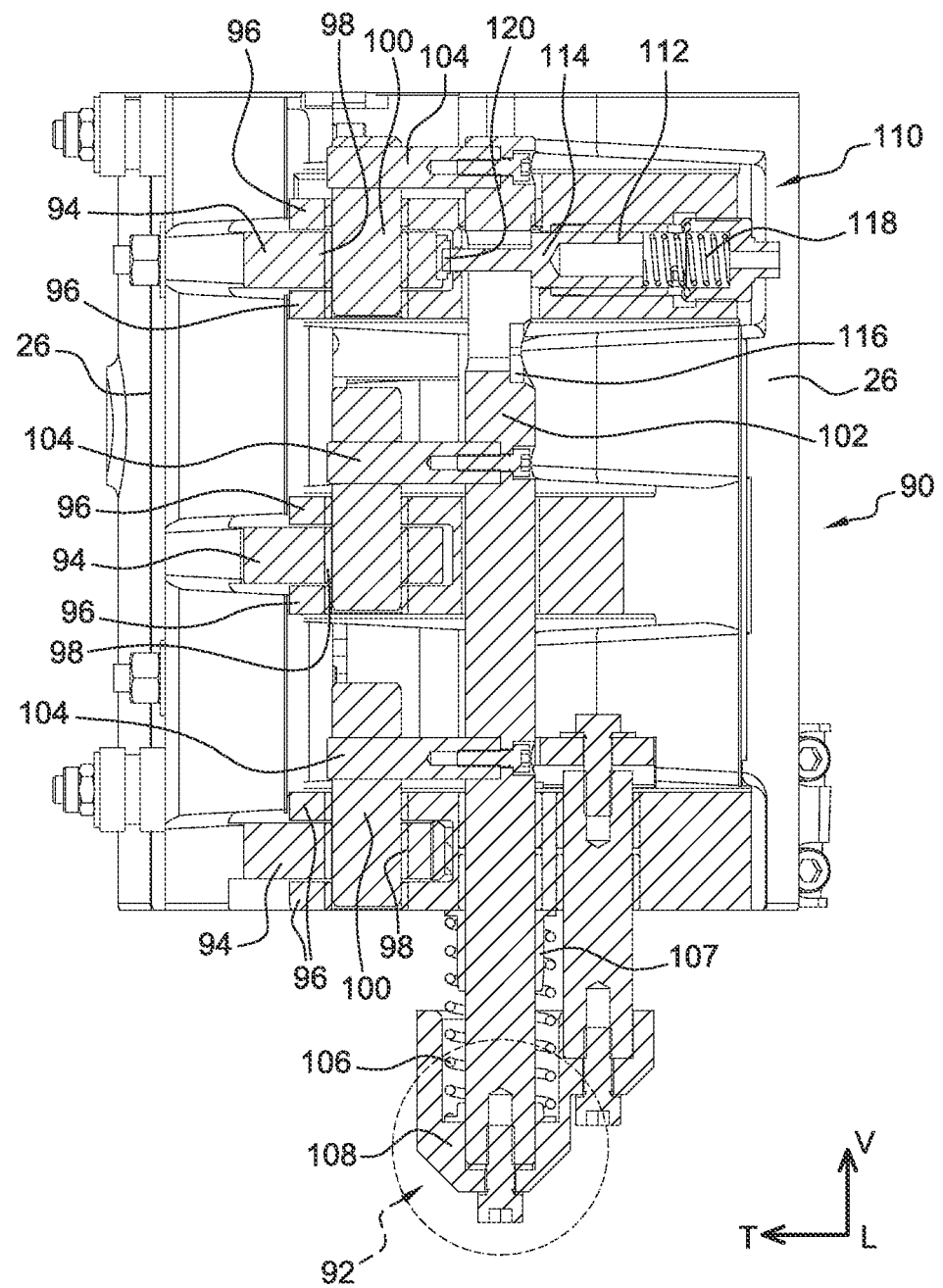
FIG. 7 is a view in cross-section which represents in detail the structure of an exemplary embodiment of a locking device of a molding unit, said locking device comprising a mechanism for blocking the locking means in the unlocked position, and illustrating respectively the locking device in the locked position and the associated blocking mechanism in the inactive position.

The locking device 90 is represented more particularly in detail in the cross-section in FIG. 7.

The half locks each comprise at least one projecting branch, preferably in this case single branches 94 for the half lock of the left mold holder 26, and double branches 96 for the half lock of the right mold holder 26.

The respective branches 94, 96 of the half locks face transversely in the direction of one another, and are offset vertically relative to one another such that, in the closed position as illustrated in FIG. 7, the branches interpenetrate one another.

Thus, each branch 94 is received between the two branches 96 which are positioned vertically above and below.

Preferably, each branch 94 of the half lock of the female type comprises an opening 98 which, extending according to a vertical axis, passes through said branch 94, and each branch 96 of the half lock of the male type supports in a sliding manner according to the vertical direction a locking finger 100.

The locking device 90 comprises drive means 102 which are connected in displacement, in this case by sliding, to the locking fingers 100, thus forming with the complementary openings 98 the locking means which are fitted such as to be mobile between a locked position and an unlocked position.

Advantageously, each locking finger 100 is integral with a connection arm 104, which itself is integral in displacement with the drive means 102.

The sliding of the drive means 102 between the locked position (low position) and the unlocked position (high position) is controlled by the control member 92, which is preferably formed by a roller integral with the drive means 102, such as a shaft.

Thus, the locking device 90 of the molding unit 24 comprises a member 92 for control of the locking means 98, 100, which are fitted such as to be mobile between:

a locked position in which the mold holders 26 of the molding unit 24 are kept in the closed position by said locking means 98, 100; and an unlocked position in which the mold holders 26 are free to be displaced between the closed position and the open position.

In the operating mode known as the production mode of the machine, the control member 92 constituted by the roller (shown in a broken line in FIG. 7) is designed to co-operate with complementary cam means, in order to control said locking means 98, 100 of the locking device 90 selectively between said locked and unlocked positions.

With reference to FIG. 1, cam means of this type are arranged in a machine 10 in the vicinity of the area Zi of introduction of the preforms 14 and the area Ze of discharge of the containers 14', such as to actuate the roller which forms the control member 92 of the locking device 90.

In a known manner, other cam means are also arranged in these same areas Zi and Ze for actuation of the control member 84 of the opening/closure device 82, in order to control selectively the opening, after having previously unlocked it, then the closure, of the molding unit 24, for the purpose of being able to introduce a preform 14 or extract a container 14'.

Advantageously, the locking device 90 comprises resilient return means 106 which can automatically return the locking means 98, 100 to the locked position.

Preferably, the means 106 are formed by a resilient return spring, through which there passes centrally the shaft which forms the drive means 102, and which is supported at one of its ends on a dish 107 and at the other end on a support 108, which is secured to the drive means 102, and supports the control member 92.

For further details on the structure and functioning of a locking device 90 of this type, reference can be made for example to document FR-2.646.802, which describes a lock with a globally similar design.

Advantageously, the locking device 90 of the molding unit 24 comprises a blocking mechanism 110 which is associated with the locking means 98, 100.

Figure 8:
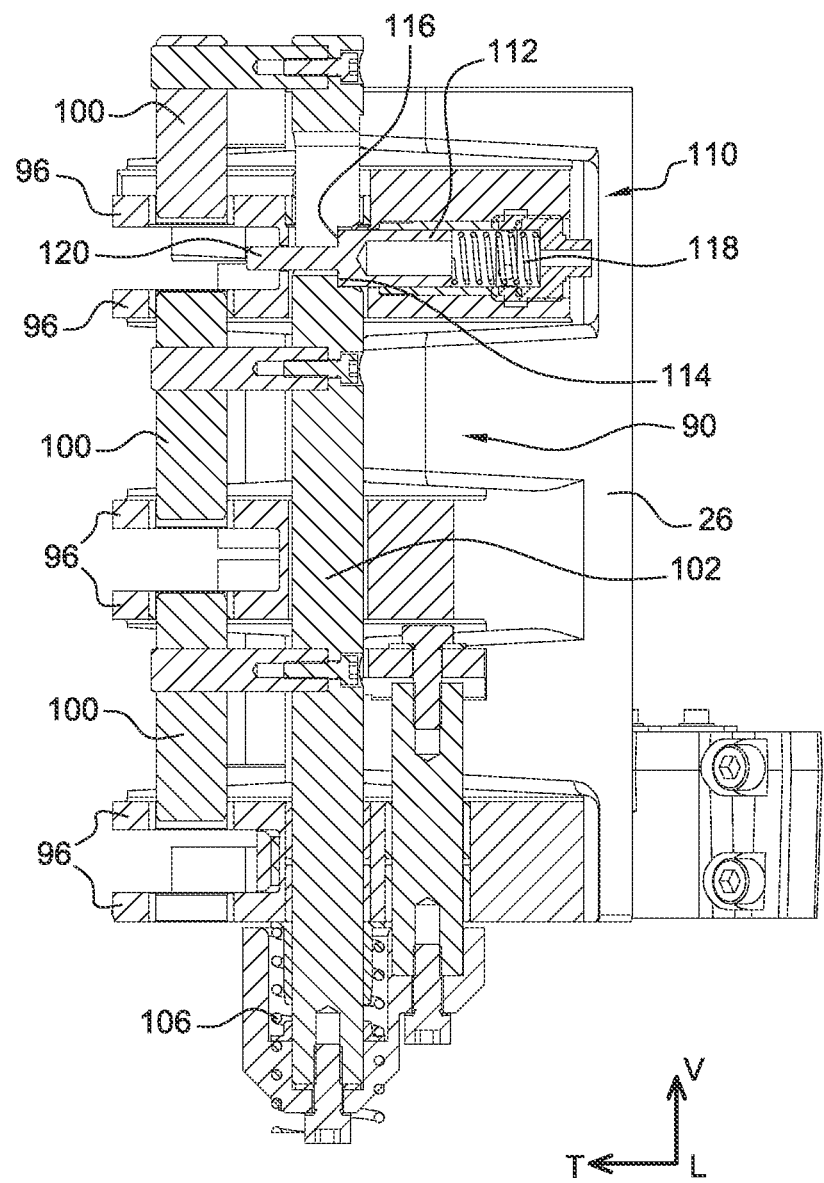
FIG. 8 is a view in cross-section similar to FIG. 7, which represents the locking device of a molding unit, and illustrates the locking device in the unlocked position and the associated blocking mechanism in the active position.

A blocking mechanism 110 of this type can be seen more particularly in FIGS. 7 and 8.

Advantageously, the mechanism 110 comprises blocking means 112 such as a slide, which can be controlled selectively between an inactive position (FIG. 7), which is associated with the locked position of the locking device 90, and an active blocking position (FIG. 8) which is associated with the unlocked position of the locking device 90.

The active blocking position corresponds to the position in which said blocking means 112 immobilize the locking means 98, 100 in the unlocked position.

Preferably, the blocking means 112 comprise a male blocking part formed by a lug 114 which can penetrate in a complementary female part of the drive means 102, and which in this case is formed by a notch 116.

By means of the co-operation of forms between the lug 114 of the blocking means 112 and the notch 116 of the drive means 102, the drive means 102 are immobilized, and can no longer slide towards the locked position in the presence or absence of application of an unlocking force on the control member 92.

In the absence of blocking by the mechanism 110, a return of this type to the locked position would automatically be caused by the resilient return means 106.

In this case, the blocking means 112 are fitted such as to be mobile in translation according to the transverse direction, i.e. at right angles to the vertical direction according to which the drive means 102 of the locking means 98, 100 extend, between said inactive and active blocking positions.

Advantageously, the blocking mechanism 110 comprises a member 118 for resilient return of the blocking means 112 to the active blocking position.

Advantageously, the blocking means 112 can be displaced against said resilient return member 118, from the active position towards the inactive position, by a control element.

Preferably, the control element is formed by one of the branches 94 which can co-operate with a finger 120 integral with the blocking means 112, such as to give rise automatically to unblocking of the mechanism 110 during the closure of the mold holders 26 of the molding unit 24.

The finger 120 projects transversely beyond the male part formed by the lug 114, and as far as the receptacle delimited by the branches 96 in which the branch 94 is designed to be received in the closed position, the end of said branch 94 then co-operating with the end of said finger 120, such as to give rise to the transverse sliding of the blocking means 112 from the active blocking position to the inactive position, against the resilient return member 118.

Consequently, from the start of opening of the mold holders 26, when the branch 94 is disengaged from between the branches 96, and is no longer thrusting the finger 120, the blocking means 112 are automatically returned to the active blocking position in which the lug 114 inserted in the notch 116 ensures the immobilization of the locking means 98, 100 in the unlocked position.

It will be appreciated that the locking device 90 described and represented in FIGS. 7 and 8 is indicated purely by way of non-limiting example.

A description will now be provided of an embodiment according to the invention of an automated system for changing the mold of a molding unit 24 with which a machine 10 for manufacturing containers 14' is provided.

The automated system 1 according to the embodiment described hereinafter is designed particularly, but not exclusively, to be used to proceed to change a mold of a molding unit 24 according to the exemplary embodiment previously described with reference to FIGS. 2 to 8.

The automated system 1 comprises at least one control module M which can automate all or at least part of the operations which are implemented in order to carry out a complete mold change of a molding unit 24.

The control module M of the system can occupy at least:
 a monitoring state associated with an operating mode of the machine 10, known as the production mode, for the manufacture of containers by the machine; and
 a state of use associated with another operating mode of the machine 10, known as the intervention mode, in which said module M can control selectively at least the locking device 90 and the device 82 for opening and closure of the molding unit 24.

The control module M comprises at least a first actuating device 122 which is associated with the device 90 for locking of the molding unit 24. The first actuating device 122 comprises first maneuvering means 124 which, when the molding unit 24 occupies a reference position which is predetermined relative to said module M, can co-operate with the control member 92 of the locking device 90, in order to control the locking means 98, 100 selectively between said locked and unlocked positions.

Figure 9:
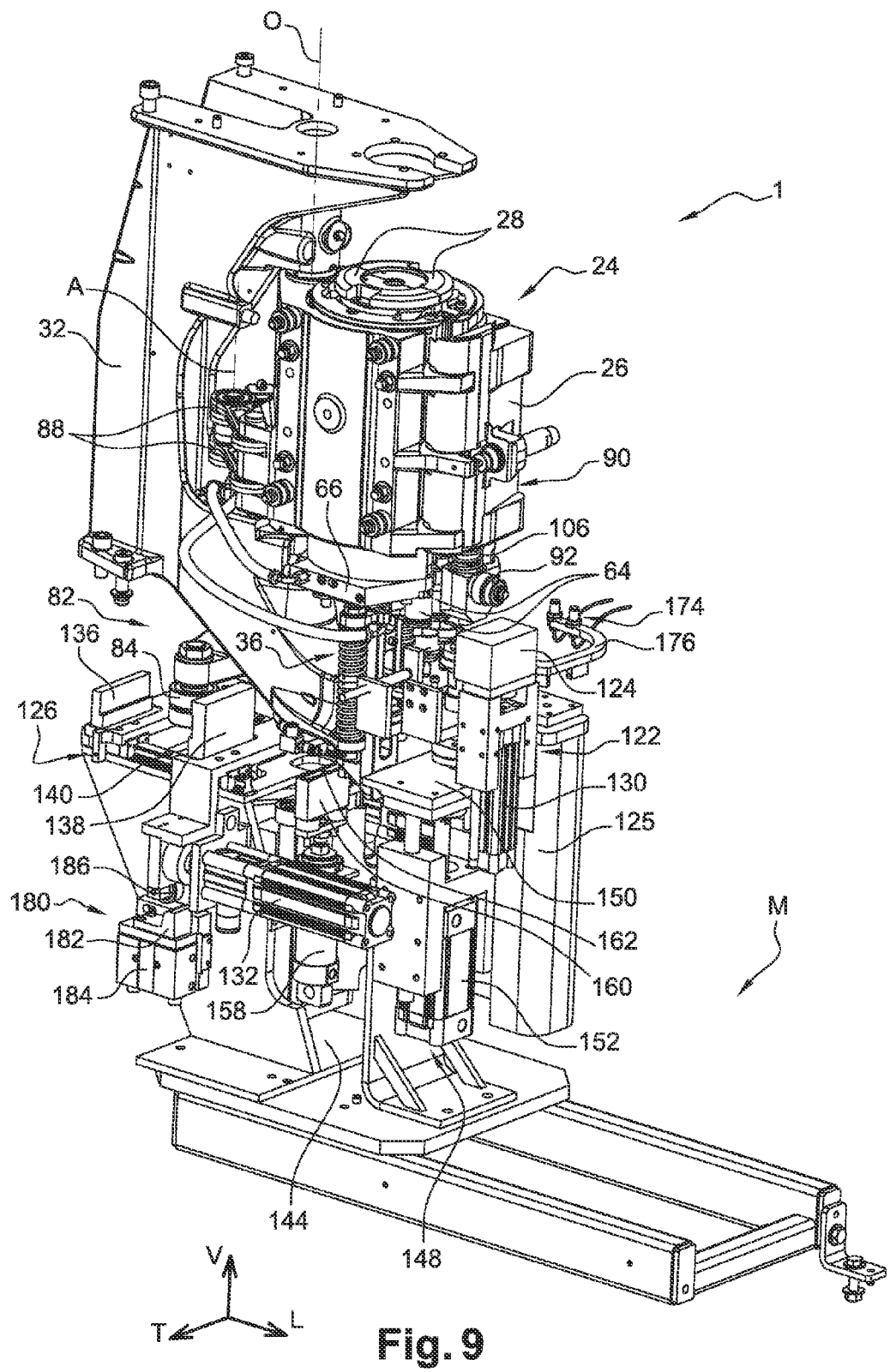
FIG. 9 is a view in perspective which represents a molding unit according to FIGS. 1 to 4 and a preferred embodiment of the control module according to the invention, and which illustrates a molding unit in the reference position predetermined relative to the module, said module being in the monitoring state.

FIG. 9 represents a molding unit 24 occupying said reference position which is predetermined relative to the control module M.

More specifically, said molding unit 24 is brought to the reference position by controlling the rotation of the carousel 22 of the machine 10 until the unit 24 is correctly positioned relative to the module M.

Preferably, the module M occupies a fixed position relative to the machine 10, and the molding units 24 are then brought successively into the reference position for the purpose of changing the mold.

Once the predetermined reference position has been reached, the molding unit 24 remains in said reference position throughout the mold change cycle, and there is no movement or relative displacement between the molding unit 24 and the control module M.

Advantageously, the first maneuvering means 124 are fitted such as to be mobile relative to the module M, between at least:
 a first position PV1 corresponding to the locked position of the locking means 98, 100 of the locking device 90 of the molding unit 24; and
 a second position PV2 corresponding to the unlocked position of the locking means 98, 100 of the locking device 90 of the molding unit 24.

The control module M comprises at least a second actuating device 126 which is associated with the device 82 for opening and closure of the molding unit 24.

The control module M comprises second maneuvering means 128 which are distinct from the first maneuvering means 124 of the first actuating device 122.

When the molding unit 24 occupies said reference position which is predetermined relative to said module M, the second maneuvering means 128 can co-operate with the control member 84 of the opening/closure device 82, in order to control selectively the opening and closure of the molding unit 24.

Advantageously, the second maneuvering means 128 are fitted such as to be mobile relative to the module M, between at least:
 a first position PL1 corresponding to the closed position of the molding unit 24; and
 a second position PL2 corresponding to the open position of the molding unit 24.

By means of a control module M of this type, the system can automate at least the actuation of the control members 92 and 84 of said devices 90 and 82 during the mold change cycle of a molding unit 24.

The first actuating device 122 comprises at least one first actuator 130 in order to displace selectively, between at least the first position PV1 and the second position PV2, a first maneuvering member 124 which forms said first maneuvering means.

The first maneuvering member 124 is fitted such as to be mobile in translation, according to the vertical direction, i.e. from the bottom upwards and vice versa, and is displaced by the first actuator 130 which is advantageously controlled by a control unit (not represented) of the control module M.

The second actuating device 126 comprises at least a main actuator 132 for selective displacement between at least the first position PL1 and the second position PL2, with a second maneuvering member 128 forming said second maneuvering means.

The second maneuvering member 128 is fitted such as to be mobile in translation according to the longitudinal direction, i.e. from the front rearwards and vice versa, and is displaced by the main actuator 132, which is controlled by the control unit (not represented) of the control module M.

Preferably, the second maneuvering means 128 of the control member 84 of the device 82 for opening and closure consist of a controlled gripper 128 comprising two clamping jaws 136 and 138, at least one 136 of said clamping jaws being fitted such as to be mobile relative to the other clamping jaw 138.

Advantageously, at least one 136 of said clamping jaws 136 and 138 is fitted such as to be mobile between:
- a position of rest of the gripper 128, in which the clamping jaws 136 and 138 are spaced from one another; and
- a position of work of the gripper 128, in which said clamping jaws 136 and 138 are brought towards one another in order to co-operate with said second control member 84.

Advantageously, the second actuating device 126 of the module M comprises at least one secondary actuator 134, in order to displace selectively said at least one mobile clamping jaw 136 between said positions of rest and work of the gripper 128.

The mobile clamping jaw 136 of the gripper 128 is displaced selectively by the secondary actuator 134 which is associated with it, in order to bring it towards, or to space it from the other clamping jaw 138, in order for said clamping jaws 136 and 138 to occupy respectively said positions of work or rest of the gripper 128.

In the position of rest of the gripper 128, the clamping jaws 136 and 138 are spaced by a given distance which is greater than the dimensions of the roller which forms the control member 84 of the device 82 for opening/closure of the molding unit 24, by means of which, in particular when the molding unit 24 is brought into the predetermined reference position plumb with the control module M, no interference takes place between said control member 84 and the gripper 128.

In the position of work of the gripper 128, the clamping jaws 136 and 138 are displaced together by the main actuator 132, between said first and second positions PL1, PL2, and then drive said control member 84 positioned between the clamping jaws 136 and 138 of the gripper 128 into the position of work.

Preferably, the clamping jaws 136 and 138 are fitted such as to be mobile in translation, according to the longitudinal direction, on guide means 140, such as two parallel slides.

The first maneuvering means 124 represented in FIG. 9 onwards constitute only an exemplary embodiment of a maneuvering member.

In fact, with the locking device 90 of the molding unit comprising means 106 for resilient return of the locking means 98, 100 to the locked position, the maneuvering member 124 has the function of co-operating with the control member 92, in order to give rise to the unlocking of the locking means 98, 100, when the locking is obtained automatically as a result of the presence of said resilient return means 106.

The maneuvering member 124 is displaced by the first actuator 130, vertically upwards, according to an unlocking course which corresponds to the translation from the first position PV1 to the second position PV2, in which second position PV2 the maneuvering member 124 thrusts the control member 92 against resilient return means 106, with a thrust force.

As a variant, according to the design of the locking device 90, the unlocking is obtained by the maneuvering member 124 by applying a traction force to the control member 92.

In fact, locking devices 90 also exist wherein the unlocking is obtained by exerting a traction force, for example from the top downwards according to the vertical direction.

In the absence of means 106 for resilient return to one or the other of the locked and unlocked positions of the locking means 98, 100 of the locking device 90, the first maneuvering means 124 can co-operate with the control member 92 in order to give rise to the unlocking and locking.

Advantageously, the locking device 90 comprises a blocking mechanism 110 which can block the locking means 98, 100 in the unlocked position, in particular when said locking device 90 also comprises means 106 for resilient return of said locking means 98, 100 to the locked position.

As described previously, from the start of opening of the mold holders 26, when the branch 94 is disengaged from between the branches 96, and no longer thrusts the finger 120, the blocking means 112 are automatically returned to the active position of blocking in which the lug 114 inserted in the notch 116 ensures the immobilization of the locking means 98, 100 in the unlocked position.

The maneuvering member 124 of the first actuating device 122 having given rise to the unlocking, the opening of the mold holders 26 is then controlled by the second actuating device 126, and, when sufficient spacing has been obtained between the mold holders 26, it gives rise to the automatic return of the blocking means 112 to the active blocking position of the locking means 98, 100.

In the presence of a blocking mechanism 110, the maneuvering member 124 can then cease to co-operate with the control member 92 of the locking device 90, since the locking means 98, 100 are blocked in the unlocked position.

However, because of the presence of the means 106 for resilient return to the locked position, it will also be appreciated that a force exerted accidentally on the finger 120 could give rise to unintentional unblocking of the locking means 98, 100, which would immediately be returned to the locking position by the resilient return means 106.

This is why the maneuvering member 124 which forms the first maneuvering means is advantageously kept in the second position PV2 after having proceeded with the unlocking of the molding unit 24.

The maneuvering member 124 and the first actuator 130 are fitted such as to be integral with a support arm 125 which is fitted such as to pivot relative to the module M, around an axis B of rotation, by means of which the maneuvering member 124 can follow in displacement the control member 92 for example, the first phase of the mold change cycle being continued when the opening of the molding unit 24 is carried out by the second maneuvering means 128, by actuating the control member 84 of the opening/closure device 82 to the position corresponding to the open position of the molding unit 24.

Advantageously, the control module M comprises connection means 142 which can connect in displacement the first maneuvering means 124 of the first actuating device 122 and the second maneuvering means 128 of the second actuating device 126.

By means of the connection means 142, safety is advantageously improved by preventing any risk of locking of the locking means 98, 100 derived from undesirable unblocking of the blocking means 112.

In fact, in the case of accidental unblocking of the blocking means 112, the first maneuvering member 124, occupying its second position PV2 then blocks the control member 92 of the locking device 90, and by this means prevents the automatic return of the locking means 98, 100 to the locking position by the resilient return means 106.

Preferably, the connection means consist of at least one connecting rod 142, one end of which is connected to the first maneuvering means 124 of the first actuating device 122, and the other end of which is connected to the second maneuvering means 128 of the second actuating device 126.

More particularly, at one of its ends, the connecting rod 142 is connected to the clamping jaw 138 of the gripper 128 which is displaced by the main actuator 132, and at the other one of its ends it is connected to the support arm 125 of the maneuvering member 124, which is fitted such as to pivot around the axis B of rotation.

By this means, the first maneuvering means 124, occupying the second position PV2 corresponding to the unlocked position, are kept in permanent contact with the control member 92 of the locking means 98, 100, when the second maneuvering means 128 are displaced between said first and second positions PL1 and PL2, corresponding respectively to the closed position and the open position of the molding unit 24.

The connection means formed by the connecting rod 142 make it possible to keep the locking device 90 permanently in the unlocked position, with the first maneuvering member 124 co-operating with the control member 92, irrespective of the angle of opening of the molding unit 24.

Thus, independently from the presence or absence of a blocking mechanism 110, the locking device 90 is advantageously kept in the unlocked position.

The control module M comprises a framework 144 on which there are fitted at least the first actuating device 122 and the second actuating device 126.

Preferably, the control module M occupies a position which is fixed relative to the machine 10, and the framework 144 of the module M is advantageously secured on the frame of the machine 10, or as a variant it is secured on the ground.

Consequently, the maneuvering means 124, 128 of the devices 122, 126 of the module M can in particular not interfere with the control members 84, 92 of the devices 82, 90 of the molding units 24, when, with the machine 10 in the operating mode known as the production mode, the molding units 24 are rotated by the carousel 22.

Advantageously, at least the actuators of said first and second actuating devices 122 and 126 constitute means for a change of state of the control module M, between the monitoring state and the state of use, respectively.

In the monitoring state of the control module M, the secondary actuator 134 drives the mobile clamping jaw 136, such that the gripper 128 occupies its position of rest in which the control member 84 can pass between the clamping jaws 136 and 138, without contact with one or the other of the jaws, because of their spacing.

In the monitoring state of the control module M, the first actuator 130 can displace the first maneuvering means 124 to a position PV0 in which said first means 124 are retracted, in order not to interfere with the control member 92 of the locking device 90 of the molding unit 24.

In the embodiment, the first maneuvering member 124 is displaced downwards in translation according to the vertical direction, until it reaches said position PV0 situated below the first position PV1.

As a variant, the control module M is fitted such as to be mobile relative to the machine 10, and is displaced between at least two positions, corresponding respectively to the monitoring state and the state of use.

By means of the first actuating device 122 and the second actuating device 126, when the control module M is in the state of use, the operations of unlocking and opening of the molding unit 24 implemented during the first, removal phase of the mold change cycle, just like the operations of closure and locking during the second, fitting phase of the mold change cycle, are entirely automated.

Advantageously and in comparison with the solutions of the prior art, the control module M makes it possible to eliminate any intervention by at least one operator in order to carry out said operations of unlocking and locking as well as opening and closure, which were previously all executed manually.

The control module M according to the invention thus makes it possible in particular to reduce the duration of a mold change cycle.

However, for the purpose of reducing further the duration of a mold change cycle, the applicant proposes a global solution, in which all the operations required in order to carry out a mold change are automated.

By means of securing means 42, such as those invented by the applicant, the operations of release or securing of the molding elements 28 can also be automated.

Advantageously, the securing means 42 are controlled selectively between the positions of securing and release by associated actuators 64, which are preferably controlled by a control unit of the module M.

The molding elements 28 can in particular be released by securing means 42 of this type, whereas the molding unit 24 occupies its closed position, by means of which the molding elements 28 thus released can be extracted automatically in the form of a transportable unit subassembly (or whole mold), by means of a transport device comprising grasping means, advantageously associated with a robotized arm, in order to proceed automatically with the extraction of a transportable unit subassembly of this type, when the molding unit 24 is opened.

Advantageously, the control module M of the system comprises a third actuating device 146, which is associated with the securing means 42.

The third actuating device 146 can control the securing means 42 selectively in order to give rise to a change of state corresponding to the release or securing of each of said at least two molding elements 28 of the mold, relative to the associated mold holder 26.

The third actuating device 146 comprises at least one actuator which can co-operate, when the molding unit 24 occupies the closed position, with at least one actuating member 44 of the securing means 14, which are associated with one of said molding elements 28, by means of which said actuator can control the securing means 42 between at least one securing position and one release position.

In the embodiment, said at least one actuator of the third actuating device 146 consists of the actuators 64 which are designed to co-operate with the control part of the actuating members 44 of the securing means 42.

Each actuating member 44 of the securing means 42 of the molding element 28 is associated with an actuator 64, such that, since each of said two molding elements 28 is secured on its two edges 48, the third device 146 in this case comprises four actuators 64.

Preferably, said actuators 64 are fitted such as to be integral with the molding unit 24, by means of the console 66, such that said actuators 64 are permanently on board the molding unit 24 of the machine 10.

In a variant, not represented, said at least one actuator is supported by the control module M, and not by the molding unit 24, by means of which the number of actuators of the third actuating device 146 which are associated with the securing means 42 is reduced, said actuators being able to be used in order to process the molding units 24 of the machine 10 in succession, without each of these comprising actuators such as the pneumatic jacks.

According to a variant of this type, the third actuating device 146 then comprises at least one actuator associated with maneuvering means which are fitted such as to be mobile between at least a position of rest and a position of work.

The position of work corresponds to the position in which said maneuvering means can co-operate selectively with at least a control part 52 of an actuating member 44, in order to give rise in particular to the release of the molding element 28 by the securing means 42.

Advantageously, the securing means 42 comprise a member 68 for resilient return of the actuating member 44 to the securing position, and the actuators 64 of the third actuating device 146 are controlled by the control unit of the control module M, in order to give rise selectively to the release of the molding elements 28 by the securing means 42.

By means of the resilient return members 68 associated with the actuating members 44, the securing of the molding elements 28 can be obtained automatically by controlling the actuators 64, so that a release force ceases to be applied, against the resilient return members 68, by said actuators 64 on the control parts 52 of the actuating members 44 of the securing means 42.

As a variant, not represented, the securing means 42 comprise blocking means which can block an actuating member 44, against the resilient return members 68, in a position corresponding to the release position.

Preferably, the actuators 64 are jacks of the pneumatic type, which are supplied selectively with air by the control module M, and as a variant by the molding unit 24.

Advantageously, the control module M comprises a device, known as the energy supply device, comprising supply means which can supply energy selectively to at least said third actuating device 146 associated with the securing means 42, in order to control the securing means 42 selectively, and give rise to a change of state corresponding to the release or securing of each of said at least two molding elements 28 of the mold.

Preferably, the energy supplied by the supply device is pressurized air, which in particular is supplied to the actuators 64 which are associated respectively with each actuating member 44 of the securing means 42.

Preferably, the module M comprises a single device for supply of pressurized air which can supply firstly said actuators 64 associated with the securing means 42, and secondly the actuating means of the locking means which intervene between the seat 38 and the mold base 34.

Said air supply device will be described in greater detail hereinafter.

As a variant, the module M comprises at least two similar and distinct supply devices which are associated respectively with the actuators of the means for securing the molding elements 28 for one of them, and with the means for locking the mold base 34 with the seat 38 for the other one of them.

In the exemplary embodiment previously described with reference to FIGS. 2 to 4, the mold of the molding unit 24 additionally comprises a mold base 34, as well as the two molding elements 28.

In the solution provided by the applicant, the mold base 34 is advantageously extracted from, or introduced into, the molding unit 24 at the same time as the two molding elements 28, by means of the constitution of a transportable unit subassembly with the three parts of the mold.

In the exemplary embodiment, the mold base 34 comprises a shoulder 33, which, in the joined position of the mold, co-operates with a complementary part of each molding element 28, such that the mold base 34 is then immobilized according to the vertical direction by co-operation of forms, and is clamped by said molding elements 28.

FIG. 4 represents a mold extracted from the molding unit 24, and forming a transportable unit subassembly of this type which thus comprises said two molding elements 28 and the mold base 34.

The two molding elements 28 and the mold base 34 must be kept together in order to form a transportable unit subassembly of this type. Advantageously, the function of keeping them together is ensured by the grasping means of the aforementioned transport device, and the mold comprises at least one part which can be grasped by the grasping means, whilst the molding unit 24 occupies the closed position.

However, in order to be able to extract a mold which forms a transportable unit subassembly of this type from the molding unit 24, the mold base 34 must be released, as the molding elements 28 are released by the securing means 42, i.e. the mold base 34 must be unlocked, then separated from the seat 38 and the support means 36.

Advantageously, the control module M comprises a fourth actuating device 148 which is associated with the support means 36 of a mold base 34 complementary with said at least two molding elements 28 of the mold.

The fourth actuating device 148 can give rise selectively to at least the separation, after unlocking, of said mold base 34 and the associated support means 36.

Advantageously, the fourth actuating device 148 can be used, during the second phase of the cycle, to control the assembly of a mold base 34 with the associated support means 36, and more particularly with the seat 38.

The fourth actuating device 148 comprises at least fourth maneuvering means 150, which are moved by at least one actuator 152 in order to drive said support means 36 selectively in displacement.

The fourth maneuvering means 150 can co-operate with the control member 40 in order to drive said support means 36 in sliding, according to the vertical direction, respectively between a high position and a low position, in order to give rise selectively to the separation or assembly between the mold base 34 and the seat 38 of the associated support means 36.

In the exemplary embodiment previously described, the separation, as an assembly, of the mold base 34 and the assembly of the seat 38—support means, can be carried out only if the locking means 36, for example of the ball type, occupy the unlocking position.

Consequently, the unlocking of the mold base 34 and the seat 38 must be carried out before the fourth maneuvering means 150 control their separation.

As previously explained, the unlocking between the seat and the mold base 34 is obtained by supplying a control chamber with air.

According to this exemplary embodiment of the locking means of the mold base 34, the forces applied by the pressurized air contained in said control chamber give rise, against resilient return means, to the displacement of the piston from a blocking position corresponding to the position of locking of the balls, as far as a release position corresponding to the unlocking position.

Advantageously, the control module M comprises a fifth device 154, known as the energy supply device, comprising supply means 156 which can supply energy selectively.

Preferably, the energy supplied in this case by the fifth supply device 154 is pressurized air.

Advantageously, the fifth energy supply device 154 can supply energy selectively to at least said third actuating device 146 associated with the securing means 42, in particular supplied to the actuators 64 which are associated respectively with each actuating member 44 of the securing means 42 according to the exemplary embodiment.

Advantageously, the fifth supply device 154 can supply energy selectively to the locking means of the mold base 34, in order to give rise to the change of state of said locking means, in this case by displacement of the piston between its positions of blocking and release corresponding to the locked and unlocked positions.

The supply means 156 are fitted such as to be mobile relative to the control module M, between at least a supply position in which said supply means 156, connected to a source of energy, are connected to the molding unit 24, such as to be able to supply said energy, and a standby position in which, since the supply means 156 are physically separated from the molding unit, they are unable to supply energy.

In the supply position, the supply means 156 can supply with air both the actuators 64 associated with the securing means 42, and the locking means of the mold base 34.

In the supply position, said supply means 156, connected to a source of energy, supply with air said actuators 64 associated with the securing means 42 of the molding elements 28, by means of which said actuators 64 can give rise to the displacement of the actuating member 44 of the securing means 42, from the securing position to the release position, in order to give rise to the release of the molding elements 28.

In the standby position, the supply means 156 can no longer supply said actuators 64 associated with the securing means 42, and, in the exemplary embodiment, the actuating members 44 of the securing means 42 are then automatically returned to the securing position by the resilient return members 68.

Advantageously, the actuators 64 on board the console of the molding unit 24 can no longer actuate the actuating members 44 of the securing means 42, said actuators 64 consequently being supplied exclusively by the supply means 156 of the fifth supply device 154.

In the supply position, said supply means 156, connected to a source of energy, supply said control chamber with air, giving rise to the displacement of the piston from the blocking position to the release position, in order to give rise to the unlocking of said mold base 34 and the seat 38 from the associated support means 36.

In the standby position, the supply means 156 can no longer supply said means for locking the mold base 34, and, in the exemplary embodiment, since the control chamber is no longer supplied with air, the piston is then returned by the resilient return means to its blocking position corresponding to the locking position of the locking means with balls.

The fifth supply device 154 comprises at least one actuator 158, which can displace the supply means 156 between said supply and standby positions.

Preferably, the supply means 156 are displaced in translation according to the vertical direction by said actuator 158, between a low position corresponding to the standby position, and a high position corresponding to the supply position.

Advantageously, the actuator 158 can be controlled by the control unit of the control module M, in order to control the position of the supply means 156 selectively.

Advantageously, in the low position corresponding to the standby position, the supply means 156 cannot interfere with a molding unit 24, when the machine 10 is in the operating mode known as the production mode.

For the fifth energy supply device 154, the actuator 158 constitutes a means of change of state relative to the module M. The monitoring state of the module M corresponds to said low position or standby position, and the state of use corresponds to the high position or supply position.

Advantageously, the actuator 158 is controlled by the control unit of the module M, in order to displace the supply means 156 from the standby position to the supply position, and once the supply position is occupied, the fifth supply device 154 can then supply with air firstly the actuators 64 and secondly the control chamber of the locking means of the mold base 34, thus giving rise respectively to the release of the molding elements 28 by the securing means 42 by actuating the actuating members 44, and to unlocking of the mold base 34 relative to the seat 38.

Figure 10:
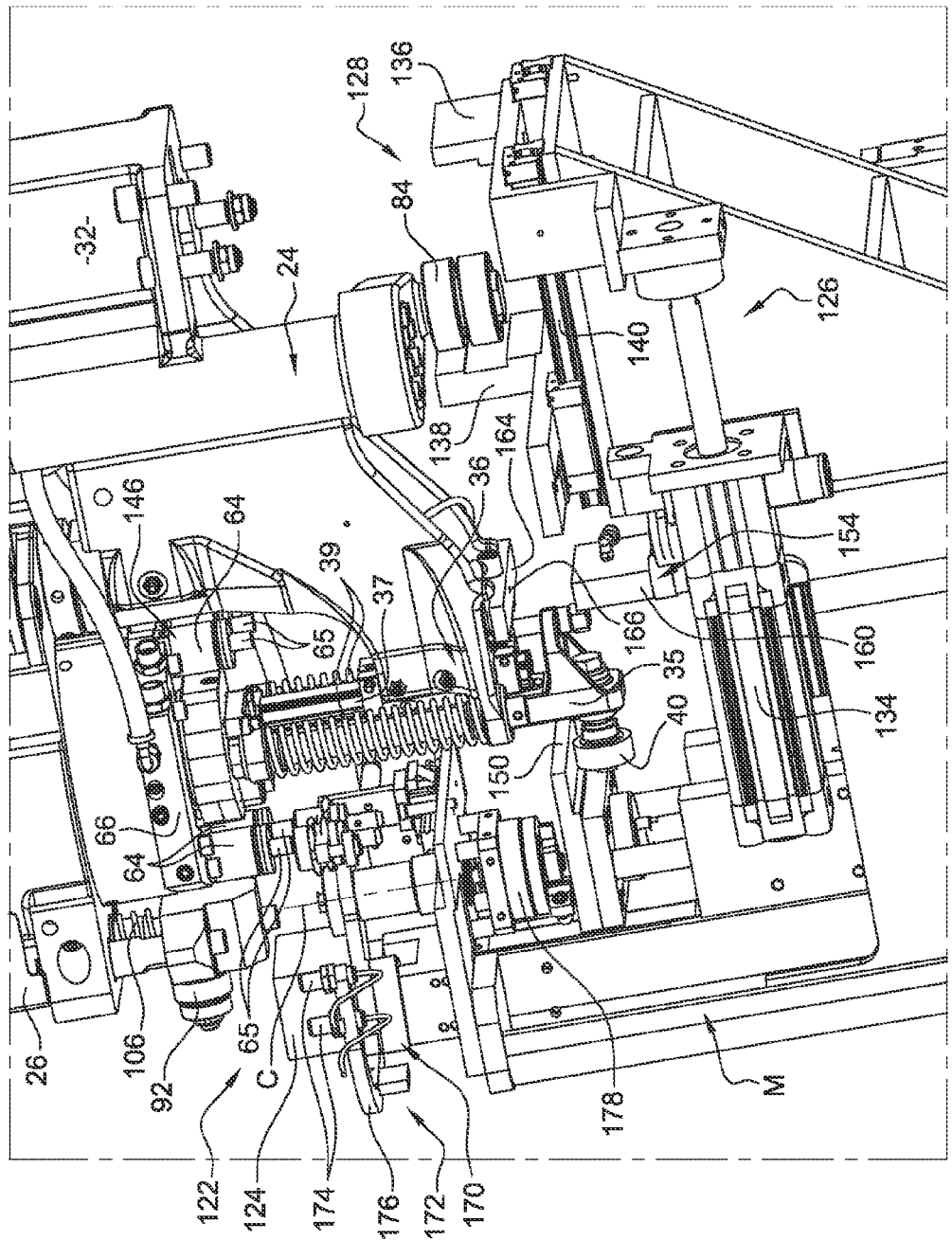

The supply means 156 can be seen more particularly in FIG. 10.

According to the embodiment, the supply means 156 comprise at least one connection means 160 forming an emitter which can be displaced by the actuator 158 between said supply and standby positions.

The connection means 160 comprises an opening 162, with an output connected to a source of energy (not represented) which can supply pressurized air selectively or permanently.

The molding unit 24 comprises a connection means 164, forming a receiver, which is complementary with the connection means 160.

The connection means 164 is supported by the console 32 of the molding unit 24, and also comprises an input opening 166.

Advantageously, at least one of said connection means 160 or 164 comprises sealing means (not represented) such as a seal.

Preferably, the sealing means are integral with the connection means 160 which forms an emitter.

In the supply position, said connection means 160 and 164 co-operate with one another, and a sealed connection is provided between them, such that the pressurized air circulates from the output opening 162 to the input opening 164.

Advantageously, the output opening 164 communicates with supply means (not represented) which can supply the air provided by the fifth supply device 154 of the module M.

The actuators 64 associated with the securing means 42 are for example supplied via ducts provided in the console 66, and the air is transported from the output opening 164 to the console 66 by means of flexible tubes comprising means for rapid connection at each of their ends.

Advantageously, the control module M comprises control means 168 which can check whether the mold base 34 is correctly locked by the locking means which intervene between the mold base 34 and the seat 38 of the associated support means 36.

Preferably, the means 168 for control of the locking of the mold base 34 are constituted by said actuator 152 associated with the means 150 for maneuvering the fourth actuating device 148.

In fact, the actuator 152 of the fourth actuating device 148 can be controlled selectively, according to a first operating mode, known as the use mode, in order to give rise to the separation or assembly of a mold base 34 and associated support means 36 comprising the seat 38.

Advantageously, the actuator 152 of the fourth actuating device 148 can also be controlled selectively, according to a second operating mode, known as the control mode, in order to check that the mold base 34 is correctly locked on the seat 38 of the support means 36.

In the second operating mode, the control of the locking of the mold base 34 is carried out by controlling the fourth maneuvering means 150 such that said means 150 exert on the control member 40 of the support means 36 a traction force downwards, when the locking is correctly carried out between the mold base 34 and the seat 38, and the maneuvering means 150 then fails to separate said mold base 34 and the seat 38 from the support means 36.

As will have been understood, in this second operating mode, the control maneuver is identical to the maneuver carried out in the first operating mode in order to give rise to the separation of the mold base 34 and the seat 38 from the support means 36, after having previously controlled the locking means of the mold base 34 to the unlocking position.

In the event of defective locking, the maneuvering means 150 gives rise to the separation of the mold base 34 and the seat 38 from the support means 36, and the control unit of the module M then advantageously emits a warning, such as a fault signal.

Advantageously, the control unit controls the different devices of the module M and of the molding unit 24, in order to proceed once more with the assembly and locking of the mold base 34 and the seat 38 of the support means 36.

Advantageously, the control module M comprises a control device 170 which is associated with the means 42 for securing molding elements 28 of the mold.

The control device 170 is designed to check that the securing of said at least two molding elements 28 of the mold on the associated mold holders 26 is effective, i.e. that it has been carried out well.

Advantageously, the control device 170 comprises control means 172 which, according to the position occupied by a mobile part 65 which said at least one actuator 64 comprises, can determine whether the securing of the molding elements 28 is correct or not.

Preferably, the means 172 for checking the securing are constituted by at least one sensor 174 which is associated with each actuator 64, and, according to the position of the part 65, can determine that said securing means 42 occupy the securing position.

In fact, the part 65 is connected in displacement with the actuating member 44 of the securing means 42, such that, in the securing position, when the actuating member 44 is returned downwards by the resilient return unit 68, said part 65 is then displaced in order to occupy a predetermined position controlled by said sensor 174 of the control means 172.

Preferably, the sensors 174 are sensors of the inductive type which can determine whether the part 65 of each actuator 64 is occupying satisfactorily the predetermined position corresponding to the securing position of the securing means 42.

Advantageously, the control means 172 can occupy at least an inactive state and an active state wherein said control means 172 can determine the position occupied by said securing means.

Preferably, the control means 172, which in this case are the sensors 174, are integral with at least a support arm 176, which, controlled in displacement by an associated actuator 178, is fitted such as to be mobile between a control position and a retracted position.

In fact, each sensor 174 must be positioned below an actuator 64, in order to control the position of the part 65. However, in the production operating mode of the machine 10, there would then be interference between the support arm 176 comprising the sensors 174 and the molding unit 24, in particular the support means 36 of the mold base 34.

This is why the control means 172 must be able to be retracted when the module M is in the monitoring state corresponding to the production operating mode of the machine 10.

Preferably, the support arm 176 of the sensors 174 is fitted such as to be mobile in rotation around an axis C with vertical orientation, and is controlled in displacement by the actuator 178 between said control and retracted positions.

Advantageously, the control means 172 can occupy at least one control position corresponding to the active state, in which said control means 172 are positioned relative to said actuators 64, associated with the securing means 42, in order to determine the position occupied by said securing means 42, and a retracted position corresponding to the inactive state.

Advantageously, said support arm 176 for the control means 172 and the associated actuator 178 constitute means for a change of state of the control means 172, between said active and inactive states, corresponding respectively to the states of use and monitoring of the module M.

The sensors 174 of an inductive type constitute only a non-limiting exemplary embodiment. As a variant, the control means 172 are constituted by control means such as a camera associated with image processing software.

According to this variant, the control means 172 are integral with the control module M, and can check remotely the state or position of the securing means 42.

Advantageously, the control module M comprises stop means 180 which can intervene selectively, before the closed position has been reached, in order to block the molding unit 24 temporarily in a given position for which the securing means 42 can occupy a position, known as the pre-securing position, which corresponds to a position in which the securing means 42 are partially engaged, without having yet reached the securing position of the molding elements 28.

In the embodiment, the stop means 180 are preferably associated with the second actuating device 126 of the device 82 for opening/closure.

The stop means 180 co-operate selectively with the second maneuvering means 128 of the control member 84 of the device 82 for opening and closure, in order to block the molding unit 24 temporarily in said given position.

The given position in which the molding unit 24 is blocked corresponds to a position adjacent to the closed position, and is characterized by the presence of predetermined play or spacing which exists between the mold holders 26, said given position corresponding to the position of pre-securing of the molding elements 28 by the securing means 42.

In the pre-securing position, the lugs 54 begin to engage in the notches 56, but the molding elements 28 are not yet secured or placed against the wall of the receptacle 50.

The stop means 180 are designed to prevent, or at least limit, thrust by torsion forces being applied on the securing means 42, and particularly the actuating members 44 comprising the lugs 54.

The stop means 180 are fitted such as to be mobile between at least:
  a retracted position in which the stop means 180 do not interfere with the second maneuvering means 128 of the control member 84 of the device 82 for opening/closure, which second maneuvering means 128 are free to be controlled in displacement between the first and second positions PL1, PL2; and
  a deployed position in which the stop means 180 can co-operate with the second maneuvering means 128, in order to block the molding unit 24 temporarily in said given position in which the means 42 for securing of the molding elements 28 can occupy said pre-securing position.

Advantageously, the stop means 180 comprise a stop element 182 which is fitted such as to be mobile between said deployed and retracted positions, by means of an associated actuator 184.

The actuator 184 can control said stop element 182 selectively in displacement, and this case in translation according to the vertical direction, in order to displace it from the retracted position to the deployed position in which said stop element 182 co-operates with a second stop element 186, which, complementary with the stop element 182, is connected in displacement with the clamping jaw 138 of the gripper 128 and with the main actuator 132, as can be seen in FIG. 10.

Thus, when the main actuator 132 exerts a traction force, longitudinally from the rear forwards, on the control member 84 of the device 82 for opening and closure, in order to give rise to closure of the mold holders 26 of the molding unit 24, said second stop element 186 comes into contact with the stop element 182, which, in the deployed position, is on its trajectory, and then interrupts the course of closure of the molding unit 24.

Advantageously, the stop means 180 occupy said retracted position when the control module M is in the monitoring state, such that the associated actuator 184 constitutes a means for a change of state.

Advantageously, the automated system according to the invention comprises a control unit (not represented) which can control said at least one control module M, by controlling in a synchronized manner, according to a predetermined sequence, at least the actuators 130, 132 and 134 of the first and second devices 122 and 126 of said control module M, in order to carry out automatically at least part of the mold change operations of a molding unit 24.

Advantageously, the control unit can control all of the actuators of the module M, in particular the actuators 152, 158, 178 and 184, as well as the actuators 64 associated with the securing means 42.

The control unit can control, in a synchronized manner, firstly at least the first and second devices 122, 126 of the control module M, and secondly, a device (not represented) for transport of a mold, known as the whole mold, constituted by said at least two molding elements 28, kept in a joined position by means which are designed to assemble them in order to form a transportable unit subassembly.

Advantageously, the transport device comprises at least a head comprising grasping means which can co-operate with at least part of a whole mold, accessible to the grasping means when the molding unit 24 is in the closed position, such as to proceed to extract a whole mold from the mold holders 26 in the open position of the molding unit 24, and/or during the introduction of a whole mold between said mold holders 26 in the open position of the molding unit 24.

In the embodiment, the automated system comprises a control module M, and as a variant the system comprises at least two control modules M, which are controlled, simultaneously or in succession, by the control unit of the system 1 in order to carry out a mold change cycle without changing predetermined reference positions of the associated molding units 24.

Advantageously, the control module(s) M is/are arranged in one or in each of the areas of intervention of the machine 10, which have the references respectively Z1, Z2 and Z3 in FIG. 1.

The invention claimed is:

1. An automated system (1) for changing a mold of a molding unit (24) with which a machine (10) for manufacturing containers is provided, said molding unit (24) comprising:
    at least two mold holders (26) which are fitted such as to be mobile between an open position and a closed position of the molding unit (24), and a mold which comprises at least two molding elements (28) which are each secured in a removable manner on an associated mold holder (26) by securing means (42);
    a device (82) for opening and closure of the molding unit (24), comprising at least one control member (84) which can displace at least one of the mold holders (26) between said open and closed positions; and
    a locking device (90) of the molding unit (24) comprising at least one control member (92) which can actuate locking means (98, 100) which are fitted such as to be mobile between:
    a locked position in which the mold holders (26) of the molding unit (24) are kept in the closed position by said locking means; and
    an unlocked position in which the mold holders (26) are free to be displaced between the closed and open positions,
characterized in that the system (1) comprises at least one control module (M) comprising at least:
    a first actuating device (122) which, associated with the locking device (90) of the molding unit (24), comprises first maneuvering means (124) which, when the molding unit (24) occupies a predetermined reference position relative to said module (M), co-operate with the control member (92) of the locking device (90), in order to control the locking means (98, 100) selectively between said locked and unlocked positions, said first maneuvering means (124) being fitted such as to be mobile relative to the module (M), between at least:
    a first position (PV1) corresponding to the locked position of the locking means; and
    a second position (PV2) corresponding to the unlocked position of the locking means;
    a second actuating device (126) which, associated with the device (82) for opening and closure of the molding unit (24), comprises second maneuvering means (128) which are distinct from the first maneuvering means (124) of the first actuating device (122) and which, when the molding unit (24) occupies said predetermined reference position relative to said module (M), co-operate with the control member (84) of the device (82) for opening and closure in order to control selectively the opening and closure of the molding unit (24), said second maneuvering means (128) being fitted such as to be mobile relative to the module (M), between at least:
    a first position (PL1) corresponding to the closed position of the molding unit (24); and
    a second position (PL2) corresponding to the open position of the molding unit (24).

2. The system as claimed in claim 1, characterized in that the first actuating device (122) comprises at least one first actuator (130), in order to displace selectively between at least the first position (PV1) and the second position (PV2), a first maneuvering member (124) which forms said first maneuvering means.

3. The system as claimed in claim 1, characterized in that the second actuating device (126) comprises at least one main actuator (132), in order to displace selectively between at least the first position (PL1) and the second position (PL2), a second maneuvering member (128) which forms said second maneuvering means.

4. The system as claimed in claim 1, characterized in that the control module (M) comprises connection means (142) which can connect the first maneuvering means (124) of the first actuating device (122) in displacement with the second maneuvering means (128) of the second actuating device (126).

5. The system as claimed in claim 1, characterized in that the control module (M) comprises a third actuating device (64) which, associated with the securing means (42), controls the securing means (42) selectively in order to give rise to a change of state corresponding to the release or securing, on the associated mold holder (26), of each of said at least two molding elements (28) of the mold.

6. The system as claimed in claim 1, characterized in that the control module (M) comprises a fourth actuating device (148) which, associated with means (36) for supporting a mold base (34) which is complementary with said at least two molding elements (28) of the mold, can give rise selectively to the separation of said mold base (34) and the associated support means (36) or assembly of said mold base (34) and the associated support means (36).

7. The system as claimed in claim 1, characterized in that the control module (M) comprises control means (150, 152) which can check that a mold base (34) which is complementary with said at least two molding elements (28) of the mold, is correctly locked by locking means which intervene between the mold base (34) and the associated support means (36).

8. The system as claimed in claim 7, characterized in that the control module (M) comprises a fifth supply device (154), comprising energy supply means (156) which can supply energy selectively for actuation of the means (42) for securing of the molding elements (28) and/or for actuation of the means for locking the mold base (34) with the associated support means (36).

9. The system as claimed in claim 1, characterized in that the control module (M) comprises a sixth control device which, associated with the means (42) for securing of the molding elements (28) of the mold, can control the securing by the means (42) for securing, of said at least two molding elements (28) of the mold on the associated mold holders (26).

10. The system as claimed in claim 1, characterized in that the control module (M) comprises stop means (180) which can intervene selectively in order, before the closed position is reached, to block the molding unit (24) temporarily in a given intermediate position for which the securing means (42) can occupy a position, known as the pre-securing position, which corresponds to a position in which the securing means (42) are partially engaged, without the securing position of the molding elements (28) having been reached.

11. The system as claimed in claim 1, characterized in that the control module (M) can occupy at least:
 a state of monitoring associated with an operating mode of the machine (10), known as the production mode, for the manufacture of containers by the machine; and
 a state of use associated with another operating mode of the machine (10), known as the intervention mode, in which said module (M) can control selectively at least the locking device (90) and the opening/closure device (82) of the molding unit (24), in order to automate at least the actuation of the control members (90, 84) of said devices (90, 82) during the mold change of a molding unit (24).

12. The system as claimed in claim 1, characterized in that the system comprises a control unit which can control said at least one control module (M) by controlling in a synchronized manner, according to a predetermined sequence, at least the actuators (130, 132, 134) of the first and second devices (122, 124) of said control module (M), in order to carry out automatically all or part of the mold change operations of a molding unit (24).

\* \* \* \* \*